United States Patent
Gantt

(10) Patent No.: US 12,037,792 B2
(45) Date of Patent: Jul. 16, 2024

(54) GUTTER COVER, GUTTER SYSTEM USING THE GUTTER COVER, AND METHOD OF INSTALLING THE GUTTER COVER

(71) Applicant: Independence Materials Group, LLC, Virginia Beach, VA (US)

(72) Inventor: William A. Gantt, Blair, SC (US)

(73) Assignee: Independence Materials Group, LLC, Virginia Beach, VA (US)

( * ) Notice: Subject to any disclaimer, the term of this patent is extended or adjusted under 35 U.S.C. 154(b) by 0 days.

(21) Appl. No.: 17/747,164

(22) Filed: May 18, 2022

(65) Prior Publication Data
US 2022/0381033 A1 Dec. 1, 2022

Related U.S. Application Data

(60) Provisional application No. 63/193,172, filed on May 26, 2021.

(51) Int. Cl.
*E04D 13/076* (2006.01)
*E04D 13/068* (2006.01)

(52) U.S. Cl.
CPC ......... *E04D 13/076* (2013.01); *E04D 13/068* (2013.01)

(58) Field of Classification Search
CPC .... E04D 13/076; E04D 13/068; Y02A 20/108
USPC ........................................................... 52/12
See application file for complete search history.

(56) References Cited

U.S. PATENT DOCUMENTS

| | | | | |
|---|---|---|---|---|
| 4,745,710 A | * | 5/1988 | Davis ................... | E04D 13/076 210/473 |
| 4,959,932 A | * | 10/1990 | Pfeifer ................. | E04D 13/076 52/12 |
| 5,257,482 A | * | 11/1993 | Sichel .................. | E04D 13/076 52/12 |
| 5,845,435 A | | 12/1998 | Knudson | |
| 6,164,020 A | * | 12/2000 | Nitch ................... | E04D 13/076 52/12 |

(Continued)

FOREIGN PATENT DOCUMENTS

AU   2015363813 A1   8/2017

OTHER PUBLICATIONS

Independence Materials Group, LLC, Canadian Patent Application No. 3,159,484, Office Action, Jan. 16, 2024.

*Primary Examiner* — Babajide A Demuren
(74) *Attorney, Agent, or Firm* — Moore & Van Allen PLLC; Jeffrey R. Gray

(57) ABSTRACT

A cover for a gutter system, the cover having opposing cover ends and opposing cover edges. The cover may include a grid segment that is operatively coupled to a front segment and/or a rear segment. The grid segment may include a primary set of ribs and a secondary set of ribs. The front segment and/or the rear segment may have one or more channels that aid in bending a portion of the cover during installation. Adjacent covers may be operatively coupled through the use of one or more couplings (e.g., projections, cavities, or the like), which also allow for thermal expansion and/or contraction of the covers when installed. Furthermore, corner strips (e.g., inner corner strips, outer corner strips, or the like) having angled slots may be utilized to assemble adjacent covers at the corners where gutters meet. The angled slots allow the covers to be assembled flush within corner strips.

15 Claims, 21 Drawing Sheets

(56) References Cited

U.S. PATENT DOCUMENTS

| | | |
|---|---|---|
| 6,202,358 B1 | 3/2001 | Janesky |
| 6,453,622 B1 | 9/2002 | Walters |
| 6,470,628 B1 | 10/2002 | Walters |
| 6,568,132 B1 | 5/2003 | Walters |
| 6,672,012 B2 | 1/2004 | Bahroos et al. |
| 6,880,294 B2 | 4/2005 | Walters |
| 6,993,870 B2 | 2/2006 | Mcdonald et al. |
| 6,993,871 B2 | 2/2006 | Richard et al. |
| 7,117,642 B2 | 10/2006 | Brown |
| 7,117,643 B2 | 10/2006 | Brown |
| 7,257,933 B2 | 8/2007 | Walters |
| 7,347,027 B2 | 3/2008 | Mcdonald et al. |
| 7,506,476 B2 | 3/2009 | Mcdonald et al. |
| 7,584,576 B2 | 9/2009 | Mcdonald et al. |
| 7,665,247 B1 | 2/2010 | Pratt |
| 7,707,781 B2 | 5/2010 | Van Cleave et al. |
| 7,736,090 B2 | 6/2010 | Janesky |
| 7,752,812 B2 | 7/2010 | Knudson et al. |
| 7,895,869 B2 | 3/2011 | Walters |
| RE42,896 E | 11/2011 | Higginbotham |
| 8,117,785 B2 | 2/2012 | Teichner et al. |
| RE43,555 E | 7/2012 | Higginbotham |
| 8,225,556 B2 | 7/2012 | Brown |
| 8,925,253 B2 | 1/2015 | Bullinger |
| 8,997,403 B1 | 4/2015 | Steinberg et al. |
| 9,683,371 B1 | 6/2017 | Nitch |
| D822,802 S | 7/2018 | Karabacak |
| D831,175 S | 10/2018 | Jackson |
| D873,979 S | 1/2020 | Brochu |
| D885,533 S | 5/2020 | Gori et al. |
| D898,168 S | 10/2020 | Wagaman |
| 10,858,837 B2 | 12/2020 | Lenney |
| 10,858,838 B1 | 12/2020 | Ng |
| 10,889,991 B2 | 1/2021 | Folkersen et al. |
| 10,900,234 B2 | 1/2021 | Dressel |
| D917,024 S | 4/2021 | Ealer, Sr. |
| 11,015,348 B2 * | 5/2021 | Gori ............... E04D 13/076 |
| D923,760 S | 6/2021 | Graves |
| 2005/0115190 A1 | 6/2005 | Brown |
| 2012/0132759 A1 * | 5/2012 | Sager ............. E04D 13/0762 |
| | | 248/49 |
| 2012/0222366 A1 | 9/2012 | Steinberg et al. |
| 2015/0184392 A1 | 7/2015 | Steinberg et al. |
| 2020/0378128 A1 | 12/2020 | Iannelli |
| 2021/0002899 A1 | 1/2021 | Lenney |
| 2021/0002900 A1 | 1/2021 | Lenney |
| 2021/0045518 A1 | 2/2021 | Lenney |
| 2021/0062512 A1 | 3/2021 | Brochu |
| 2021/0087817 A1 | 3/2021 | Lenney |
| 2021/0108419 A1 | 4/2021 | Folkersen et al. |
| 2021/0140176 A1 | 5/2021 | Lenney |
| 2021/0270041 A1 * | 9/2021 | Mischker ......... E04D 13/076 |

* cited by examiner

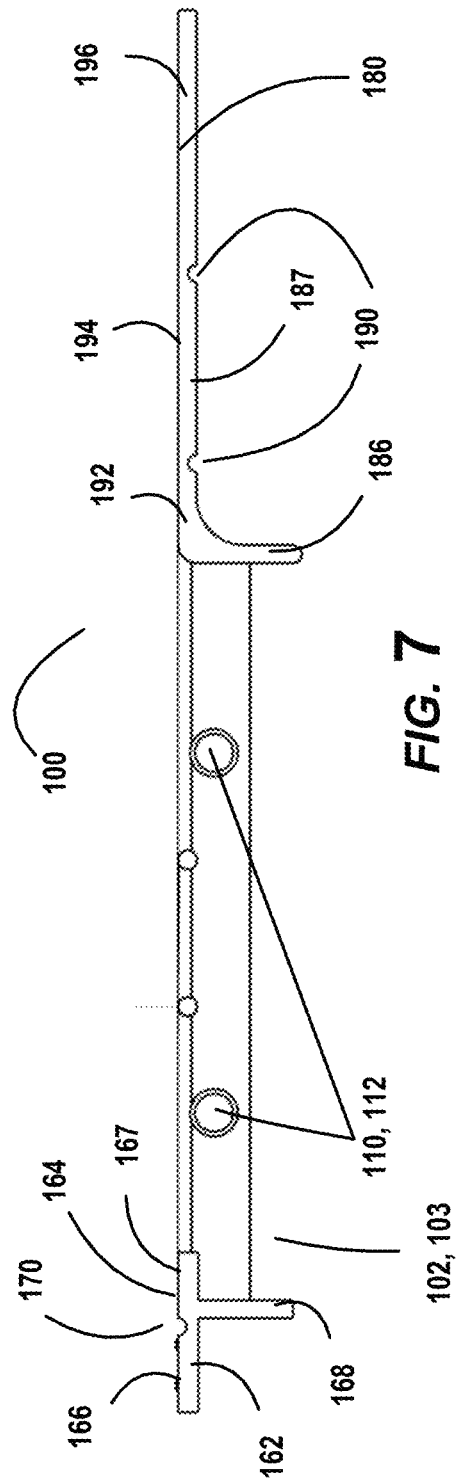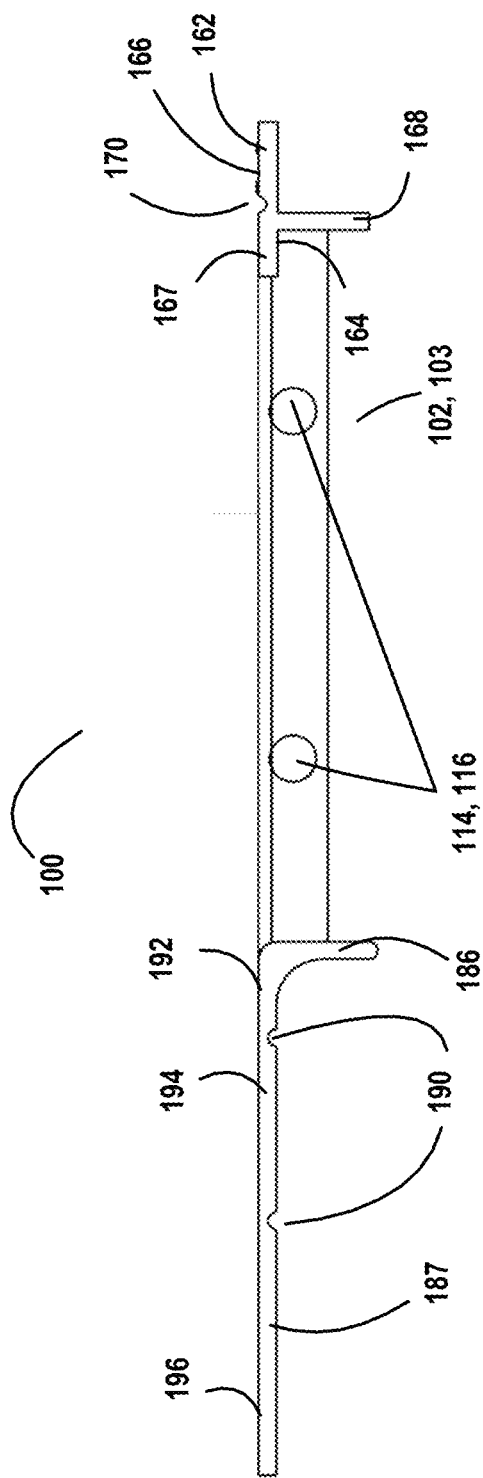

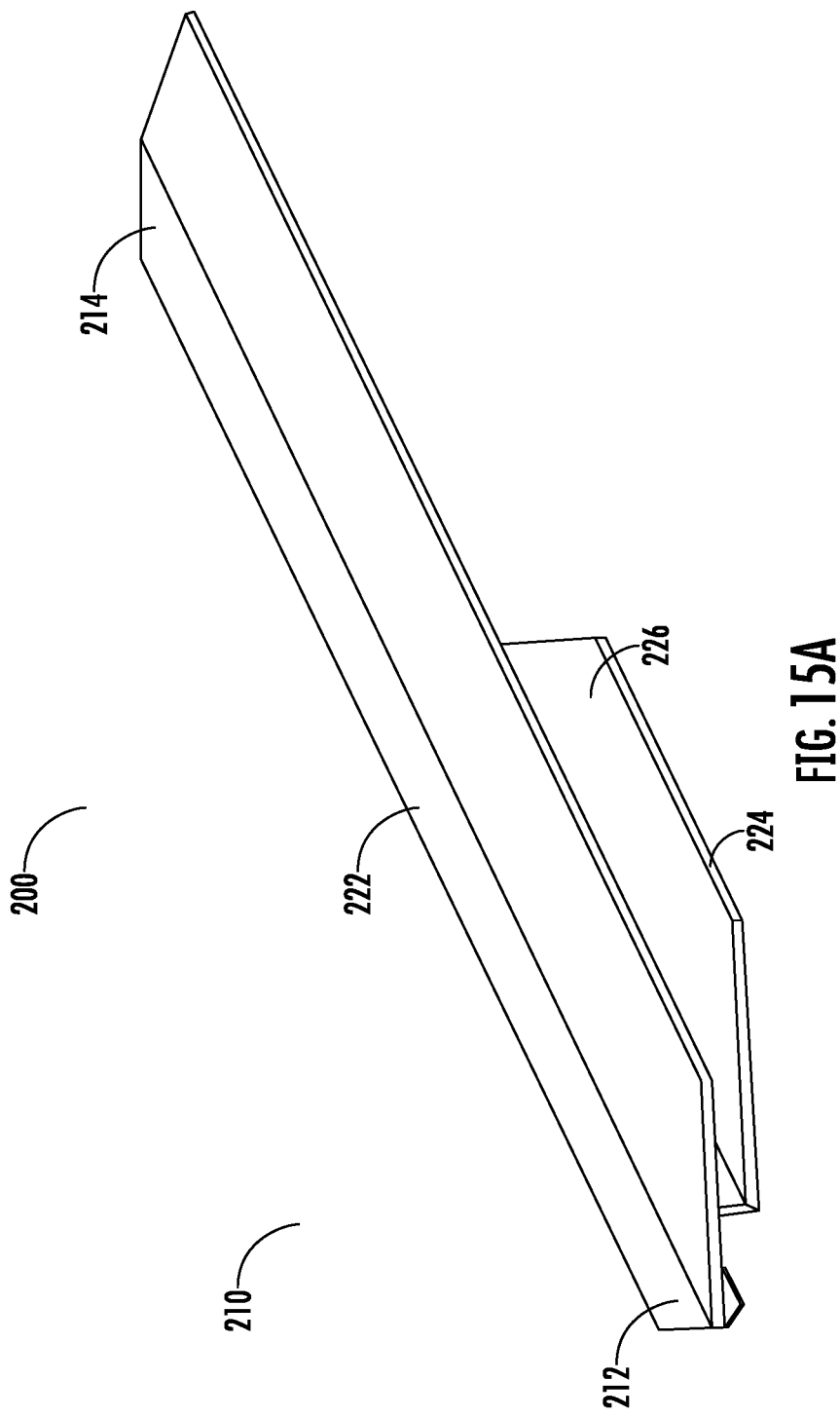

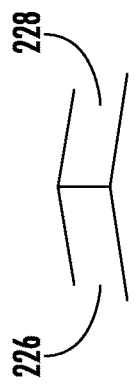
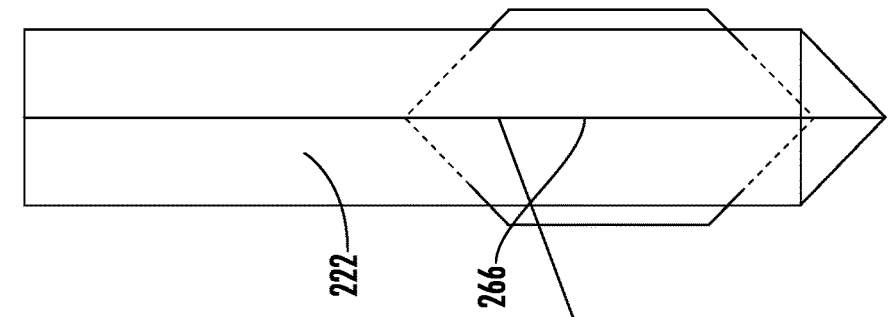
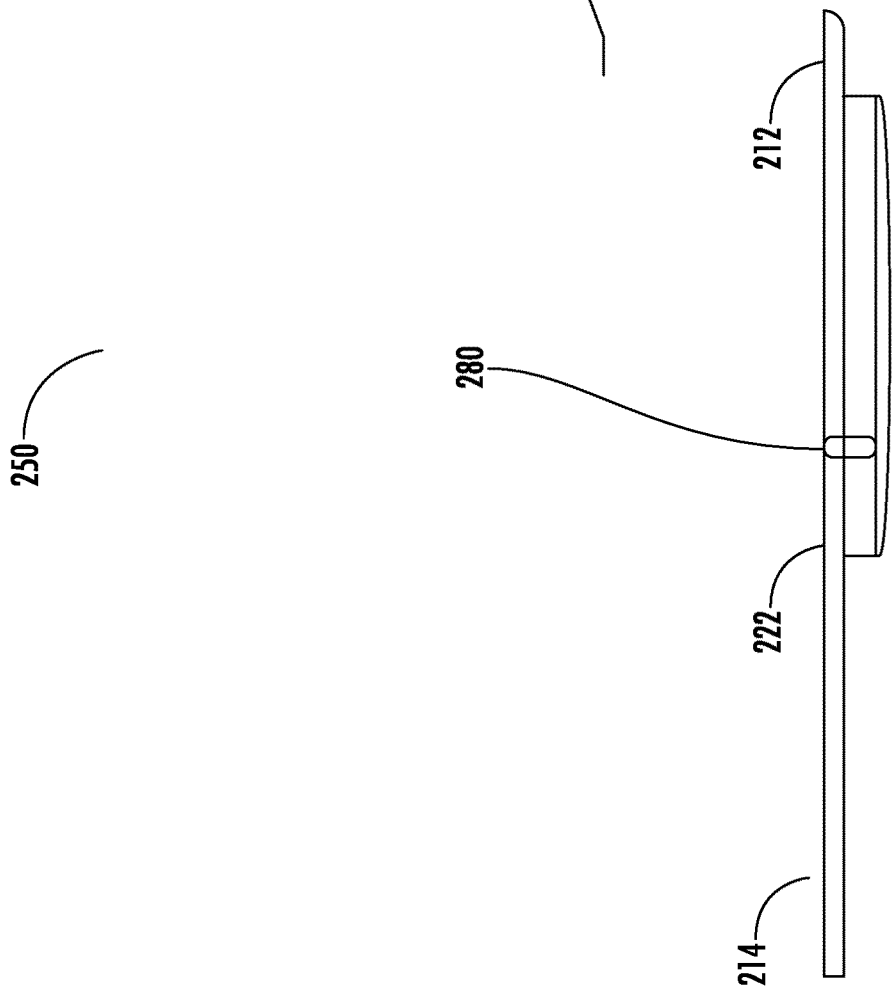

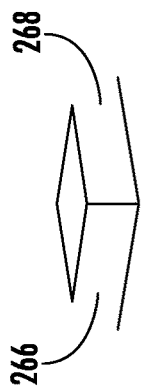
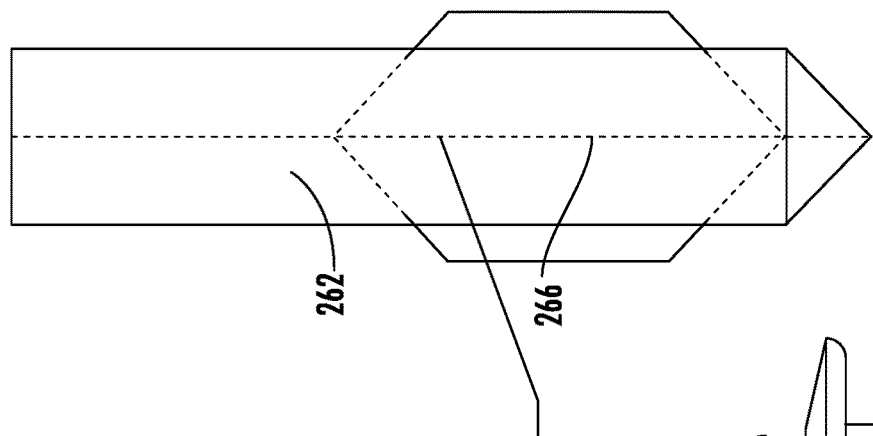
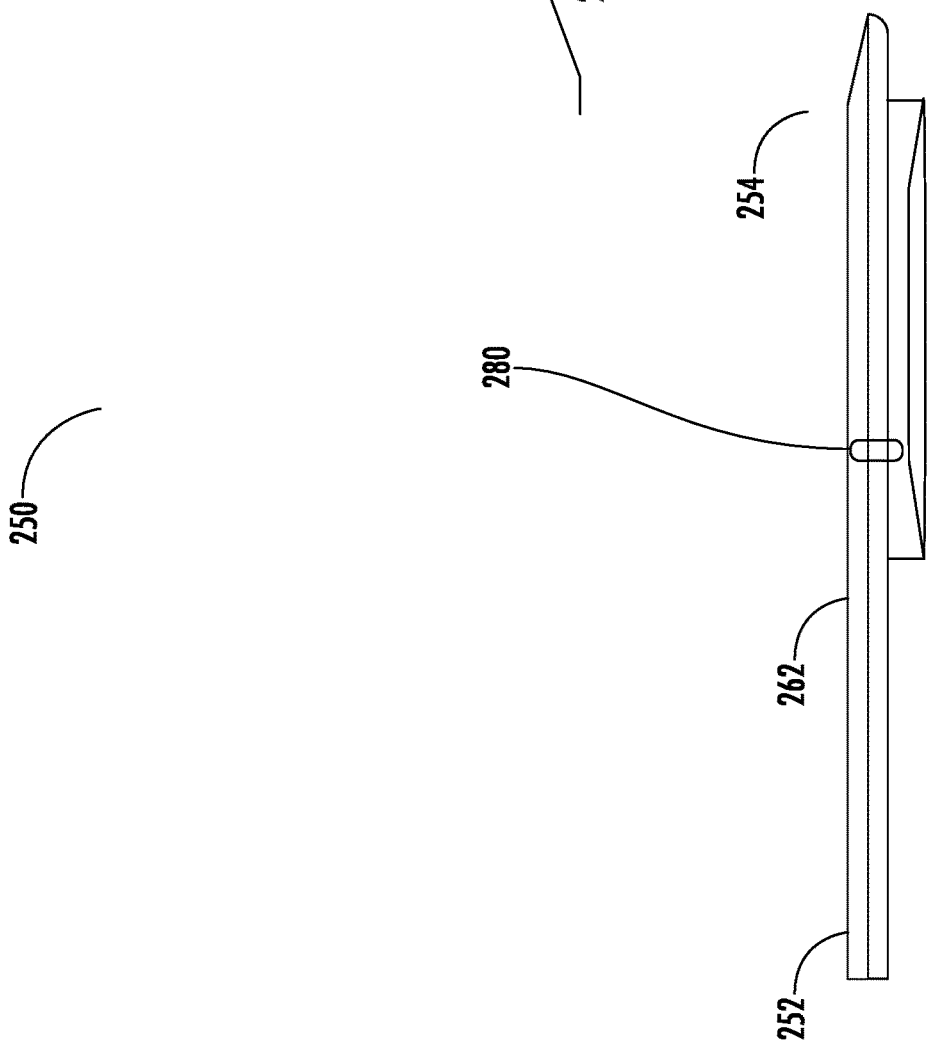

GUTTER COVER, GUTTER SYSTEM USING THE GUTTER COVER, AND METHOD OF INSTALLING THE GUTTER COVER

CROSS REFERENCE AND PRIORITY CLAIM UNDER 35 U.S.C. § 119

The present application for a patent claims priority to U.S. Provisional Patent Application Ser. No. 63/193,172 entitled "Gutter Cover, Gutter System Using the Gutter Cover, and Method of Installing the Gutter Cover," filed on May 26, 2021 and assigned to the assignees hereof and hereby expressly incorporated by reference herein.

FIELD

This application relates generally to the field of gutter systems, and more particularly to a gutter cover for a gutter system, and methods of installing the gutter system.

BACKGROUND

Typically, gutter systems are used in residential, commercial, and/or industrial buildings to collect rainwater from at least a portion of a building. However, a common problem within existing gutter systems is that they often get blocked by debris (e.g., leaves, twigs, dust, or the like). Blockage in gutter systems may cause rainwater to accumulate in parts of the gutter systems and on the roof of the building, thereby causing damage to the building. As such, there exists a need for a gutter cover that aids in reducing accumulation of debris and allows rainwater to flow freely without causing any damage to the building.

BRIEF SUMMARY

Embodiments of the present invention relate to a cover, a gutter system having the cover, and a method of installing the gutter system and/or the cover. As will be described herein, the cover has opposing cover ends (e.g., a first cover end and a second cover end) and opposing cover edges (e.g., a first cover edge and a second cover edge). The cover may comprise a grid segment that is operatively coupled (e.g., as described herein, formed integrally with, formed separately and assembled together, or the like) to a front segment and a rear segment. The grid segment may include a primary set of ribs and a secondary set of ribs, which will be described in further detail herein. While one set of ribs may be described as primary and a second set of ribs may be described as secondary, these names are only used to described two sets of ribs, and it should be understood that the nomenclature of the sets of ribs could be reversed. The front segment and/or the rear segment may have one or more channels that aid in bending a portion of the cover during installation. Adjacent covers may be operatively coupled through the use of one or more couplings (e.g., projections, cavities, or the like), which also allow for thermal expansion and/or contraction of the covers when installed. Furthermore, corner strips (e.g., inner corner strips, outer corner strips, or the like) having angled slots may be utilized to assemble adjacent covers at the corners where gutters meet (e.g., forming inner or outer angles, such as 90 degree angles or the like). The angled slots of the corner strips allow the covers to be assembled flush within corner strips for improved installation.

Embodiments of the present invention also relate to a method of installing a gutter system. The method comprises assembling a gutter to a structure. The method further comprises bending at least a portion of the front segment and/or the rear segment to aid in positioning the cover during installation. The front segment is operatively coupled to a front wall and/or front lip of the gutter, while the rear segment is operatively coupled to a rear wall of the gutter and/or the structure. The method may further comprise trimming the ends of two covers (e.g., at 45 degrees, or the like) and assembling each end into one or more slots of the corner strip for assembly at a corner of adjacent gutters (e.g., at an inner corner, and outer corner, or the like).

One embodiment of the invention comprises a cover for a gutter. The cover comprises a grid segment formed from a primary set of ribs and a secondary set of ribs, a front segment operatively coupled to the grid, and a rear segment operatively coupled to the grid. The front segment is configured to be operatively coupled to a front wall or front lip of a gutter. The rear segment is configured to be operatively coupled to a rear wall of the gutter or a support member of a structure.

In further accord with embodiments, the primary set of ribs extend between the front segment and the rear segment, and the secondary set of ribs extend between the primary set of ribs.

In other embodiments, the primary set of ribs extend perpendicularly between the front segment and the rear segment.

In yet other embodiments, the secondary set of ribs extend perpendicularly between the primary set of ribs.

In still other embodiments, a primary upper surface of the primary set of ribs and a secondary upper surface of the secondary set of ribs are located on the same planar.

In other embodiments, a primary upper surface of the primary set of ribs are located on a plane above a secondary upper surface of the secondary set of ribs.

In further accord with embodiments, at least one end of the primary set of ribs has an end cross-sectional area that is greater than an intermediate cross-sectional area of an intermediate portion of the primary set of ribs.

In other embodiments, the primary set of ribs have a primary upper surface that is rounded.

In yet other embodiments, the primary set of ribs have primary side surfaces or primary lower surfaces that are planar.

In still other embodiments, the secondary set of ribs have secondary upper surfaces that are rounded.

In other embodiments, the cover has opposing ends and opposing edges. The cover further comprises one or more projections on a first opposing end, and one or more cavities formed within a second opposing end. The one or more projections on the first opposing end are configured to be operatively coupled with one or more cavities of an adjacent cover to form a cover assembly.

In further accord with embodiments, the front segment comprises one or more front channels. The one or more front channels aid in allowing a first portion of the front segment to bend with respect to a second portion of the front segment.

In other embodiments, the front segment comprises a T-shaped segment.

In yet other embodiments, the rear segment comprises one or more rear channels. The one or more rear channels aid in allowing one or more rear portions of the rear segment to bend.

In still other embodiments, the rear segment comprises an L-shaped segment.

Another embodiments of the invention comprises a gutter system. The gutter system comprises a gutter and a cover.

The cover comprises a grid segment formed from a primary set of ribs and a secondary set of ribs, a front segment operatively coupled to the grid segment, and a rear segment operatively coupled to the grid segment. The front segment is configured to be operatively coupled to a front wall or a front lip of the gutter. The rear segment is configured to be operatively coupled to a rear wall of the gutter or a support member of a structure.

In further accord with embodiments, the cover is a first cover and the gutter system further comprises a corner strip having a first slot and a second slot and a second cover. The first angled end of the first cover is inserted into the first slot and a second angled end of the second cover is inserted into the second slot.

In other embodiments, the corner strip is an inner corner strip or an outer corner strip.

Another embodiment of the invention comprises a method of installing a cover to a gutter. The method comprises assembling a front segment of a first cover to a front wall or a front lip of the gutter and a rear segment to a rear wall of the gutter or a support member of a structure. The method further comprises assembling a second cover to the first cover. The one or more projections of a first cover are operatively coupled to one or more cavities of the second cover.

In further accord with embodiments of the invention, the method further comprises assembling an angled end of the second cover to a slot in a corner strip.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein:

FIG. 7 illustrates a first end view of the cover, in accordance with some embodiments of the disclosure.

FIG. 8 illustrates a second end view of the cover, in accordance with some embodiments of the disclosure.

FIG. 15A illustrates a perspective view of an outside corner strip for assembling adjacent covers at an outside corner of two gutters, in accordance with some embodiments of the disclosure.

FIG. 15B illustrates a side view of an outside corner strip, in accordance with some embodiments of the disclosure.

FIG. 15C illustrates a top view of an outside corner strip, in accordance with some embodiments of the disclosure.

FIG. 15D illustrates an end view of an outside corner strip, in accordance with some embodiments of the disclosure.

FIG. 16B illustrates a side view of an inside corner strip, in accordance with some embodiments of the disclosure.

FIG. 16C illustrates a top view of an inside corner strip, in accordance with some embodiments of the disclosure.

FIG. 16D illustrates an end view of an inside corner strip, in accordance with some embodiments of the disclosure.

DETAILED DESCRIPTION

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1:
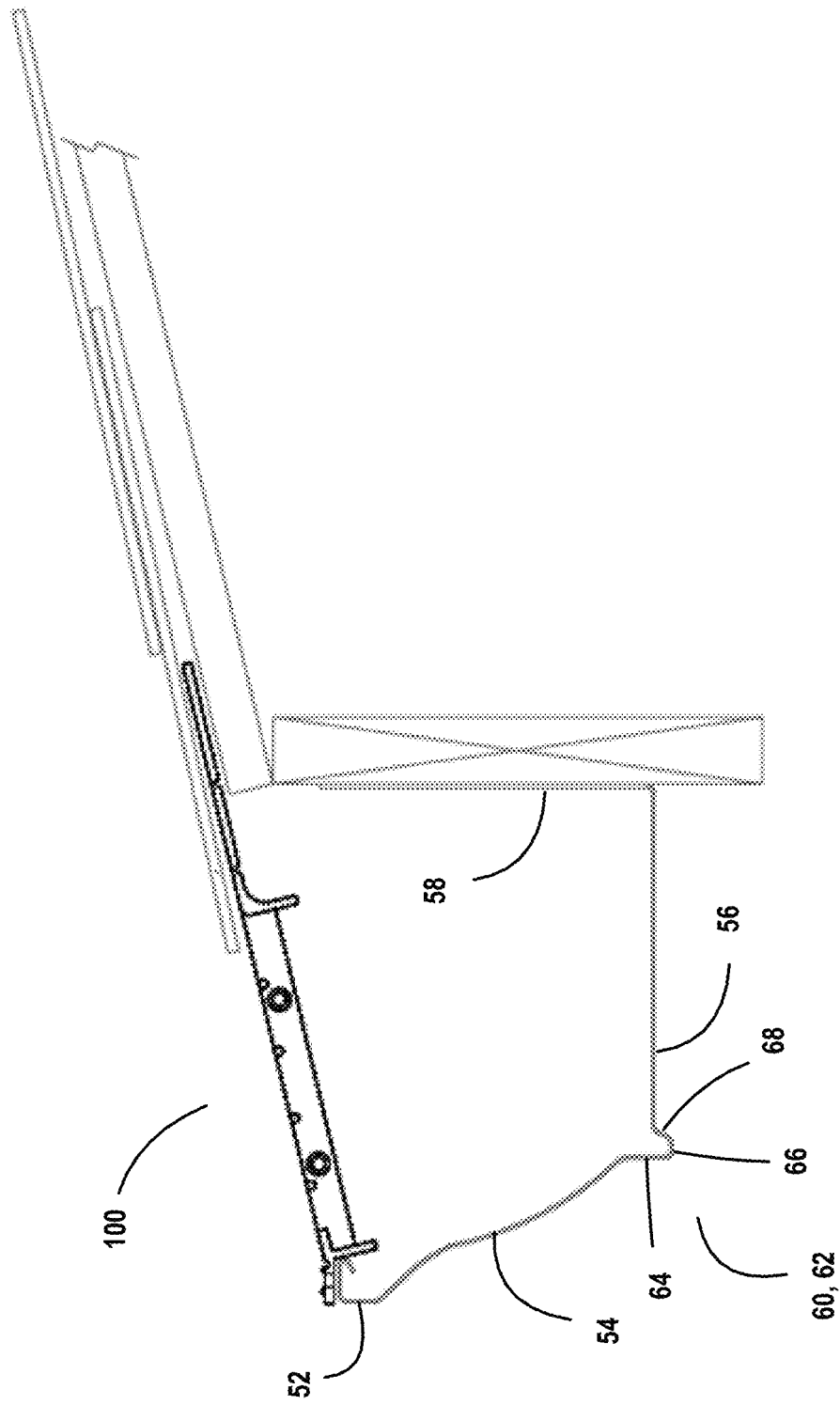
FIG. 1 illustrates a side cross-sectional view of a gutter system, in accordance with some embodiments of the disclosure.

FIG. 1 illustrates a side cross-sectional view of a gutter system 10, in accordance with some embodiments of the disclosure. The gutter system 10 comprises a gutter 50 (also described as a trough, or gutter trough) and a cover 100 that is operatively coupled to the gutter 50. The gutter 50 may comprise a front wall 54, a bottom wall 56, a rear wall 58, and the gutter lip 52. The gutter 50 further comprises a protrusion 60, that forms a surface tension break 62 for interrupting surface tension of rainwater flowing on the outside of the gutter 50, thereby aiding in preventing water from flowing the along the bottom wall 56 to the rear wall 58 and contacting part of the structure (e.g., fascia board of a building, or the like) which could damage the structure (e.g., rot the fascia board, or the like). In some embodiments, there may be more than one protrusion 60 that forms more than one surface tension break 62. In some embodiments, the one or more surface tension breaks 62 may be present on the front wall 54 of the gutter 50. In some embodiments, the surface tension breaks 62 may be present on the bottom wall 56. As illustrated, the surface tension break 62 may be located at the intersection between the front wall 54 and the bottom wall 56. As illustrated, the surface tension break 62 has a first portion 64 that extends downwardly from the front wall 54, a second portion 66 that extends rearwardly towards the rear wall 58, and a third portion 68 that extends upwardly towards the bottom wall 56. In some embodiments, the third portion 68 of the surface tension break 62 is what aids in breaking the surface tension of the water (e.g., the water is unable to move up the third portion 68). While the surface tension break 62 is illustrated as having surfaces that are planar, in other embodiments, the surfaces of the one or more portions of the one or more surface tension breaks 62 may be curved. As further illustrated in FIG. 1, and as will be described in further detail herein, the cover 100 may be operatively coupled to the gutter 50, gutter brackets (not illustrated), and/or a structure (e.g., to the roof of a building under the shingles, or the like).

Figure 2:
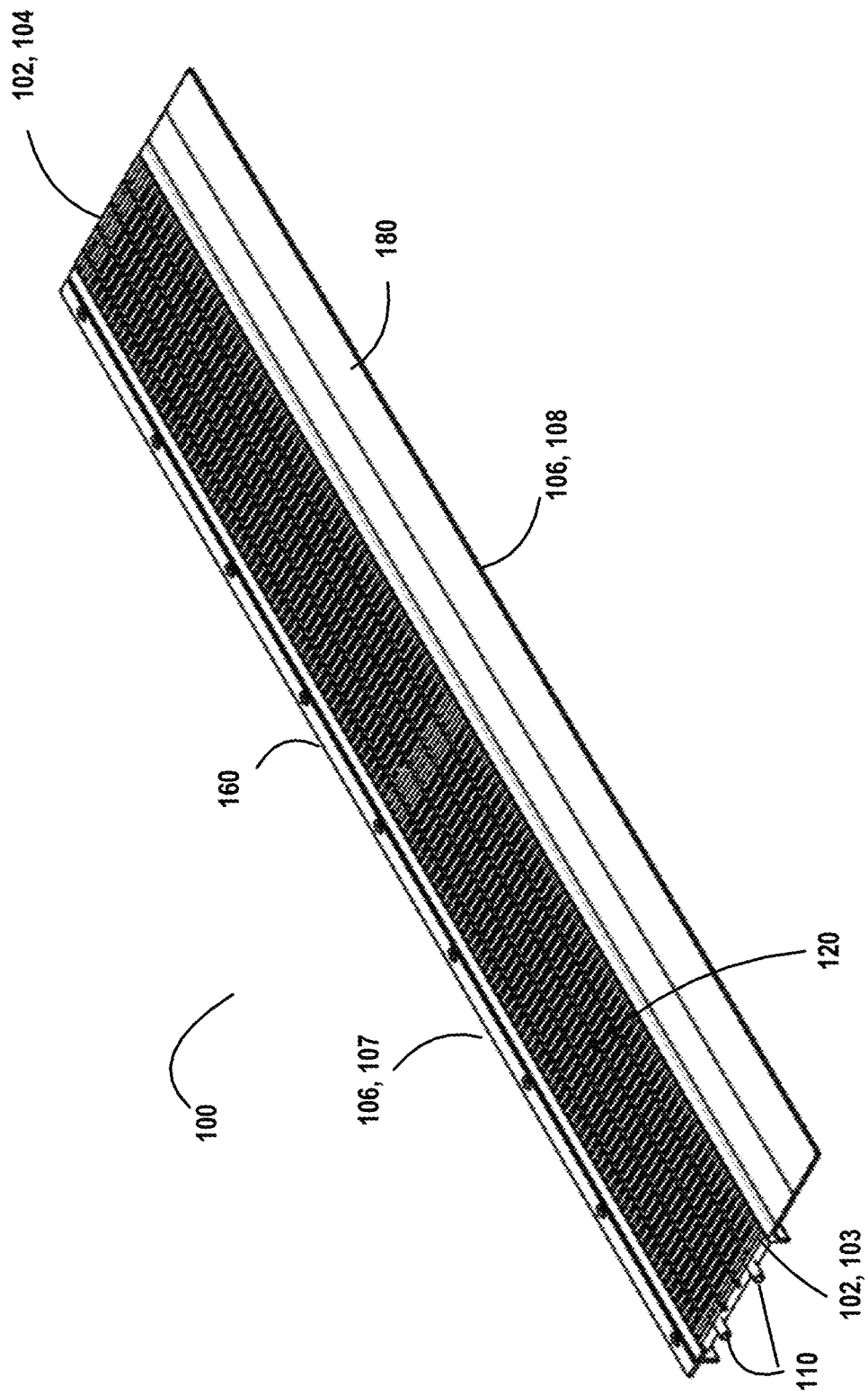
FIG. 2 illustrates a perspective view of a cover of the gutter system of FIG. 1, in accordance with some embodiments of the disclosure.

FIGS. 2 through 14D illustrate the cover(s) 100 for the gutter system 10. FIG. 2 illustrates a perspective view of a single cover 100. The cover 100 has opposing cover ends 102 (e.g., a first cover end 103 and a second cover end 104) and opposing cover edges 106 (e.g., a first cover edge 107 and a second cover edge 108). The cover 100 may comprise a grid segment 120 that is operatively coupled (e.g., as described herein, formed integrally with, formed separately and assembled together, or the like) to a front segment 160 and/or a rear segment 180. The grid segment 120 may comprise a primary set of ribs 122 (e.g., otherwise described as a first set of ribs) and a secondary set of ribs 124 (e.g., otherwise described as a second set of ribs), which will be described in further detail herein. While one set of ribs may be described as primary and a second set of ribs may be described as secondary, these names are only used to described two sets of ribs, and it should be understood that the nomenclature of the sets of ribs could be reversed.

Figure 5:
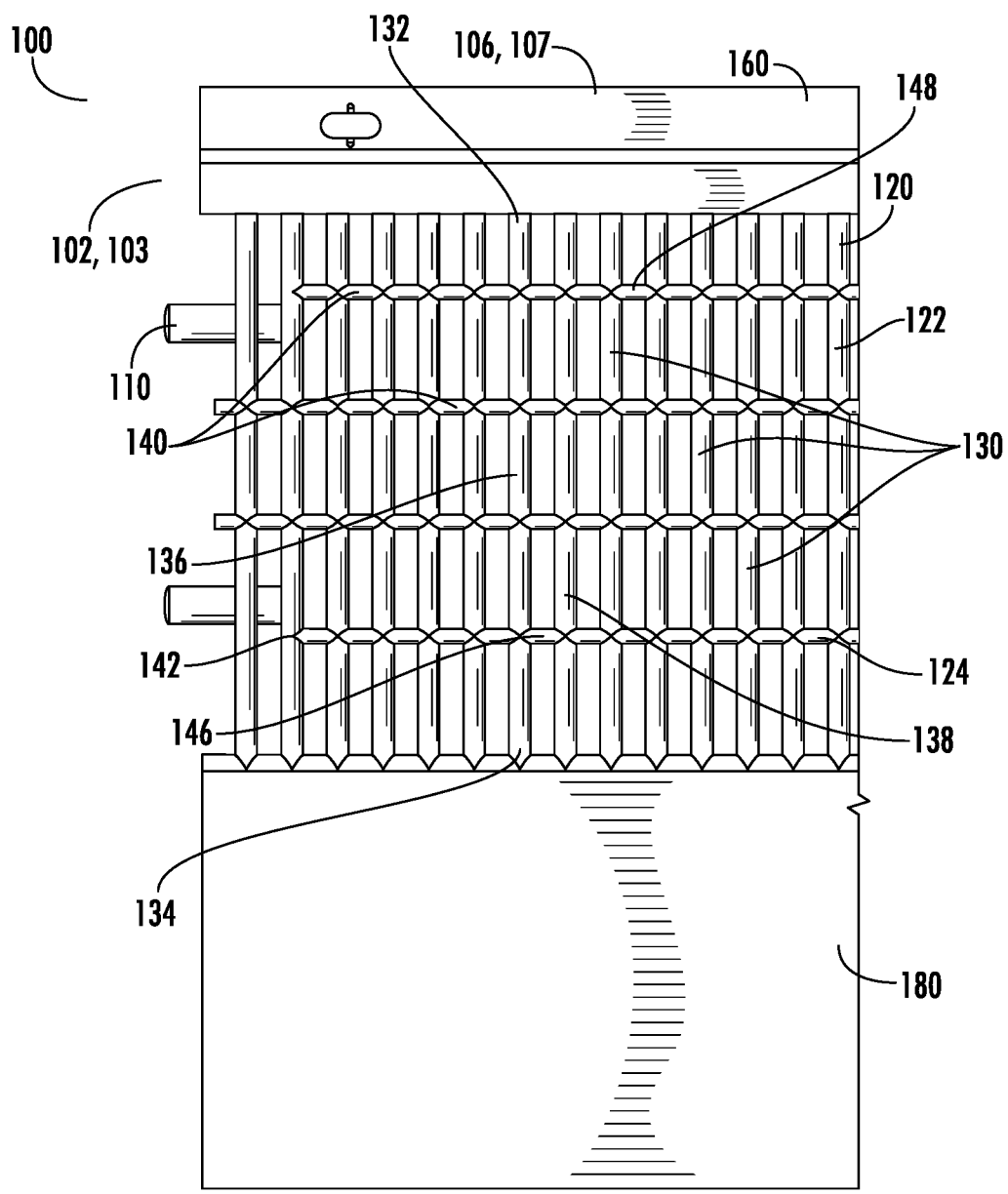
FIG. 5 illustrates an enlarged view of an end of the cover of FIG. 5, in accordance with some embodiments of the disclosure.
Figure 6:
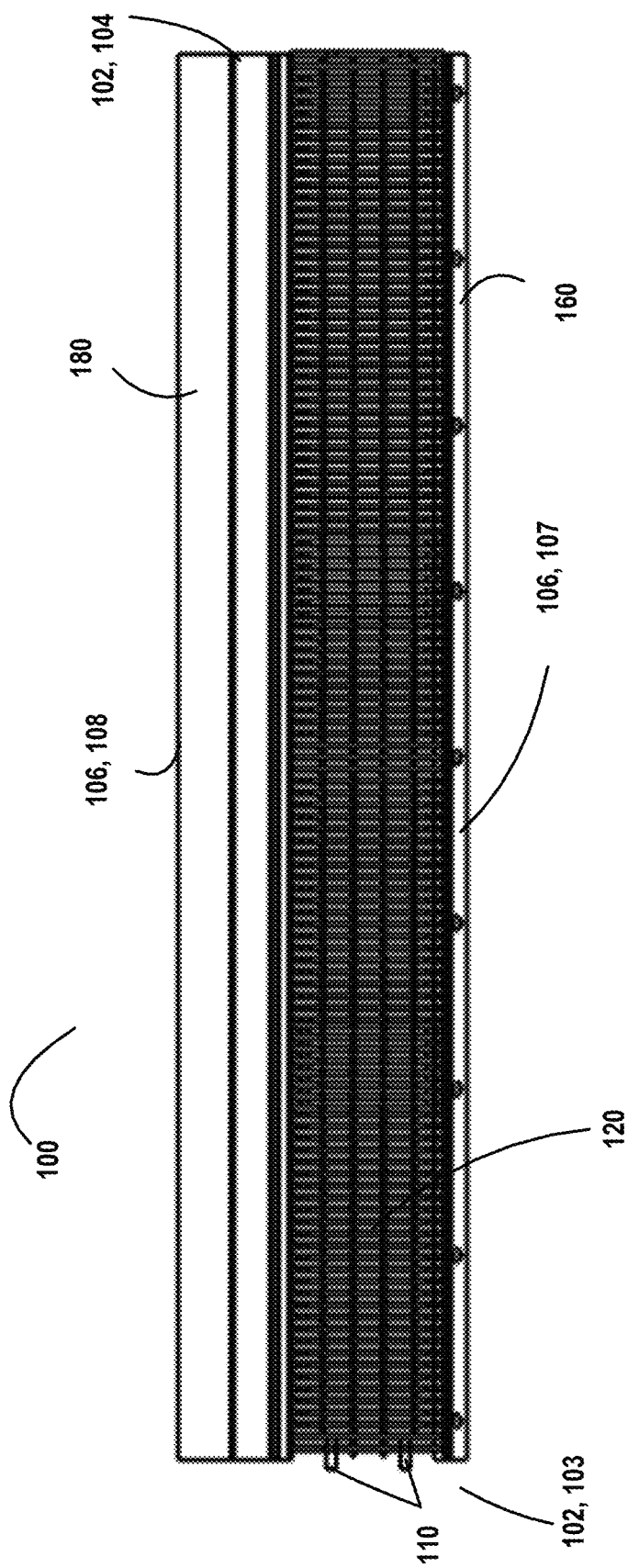
FIG. 6 illustrates a bottom view of the cover, in accordance with some embodiments of the disclosure.
Figure 9:
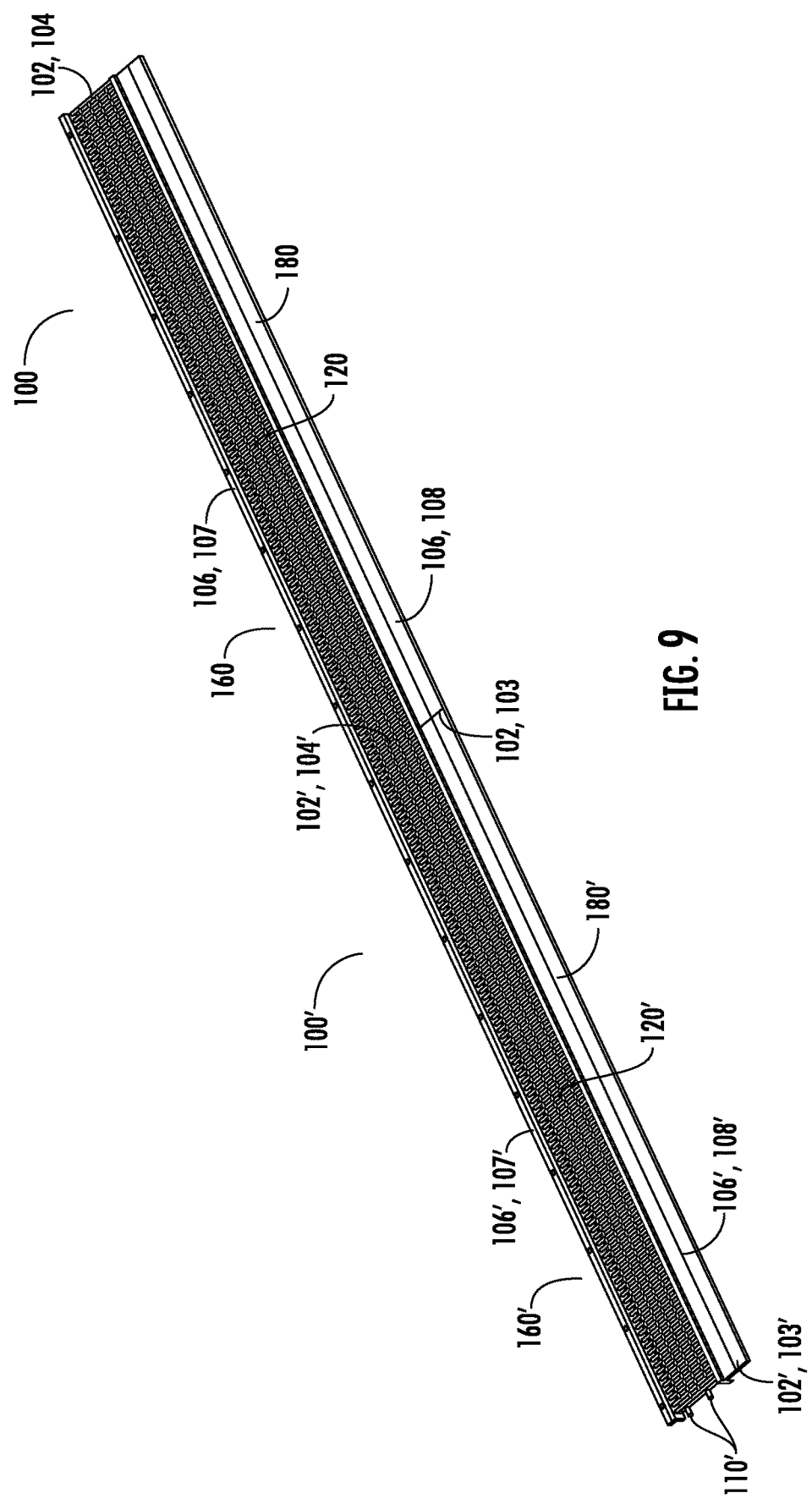
FIG. 9 illustrates a perspective view of two adjacent covers assembled together, in accordance with some embodiments of the disclosure.

As illustrated in FIG. 5, the primary set of ribs 122, in some embodiments may comprise a plurality of support ribs 130. The plurality of support ribs 130 may be any size and shape; however, as illustrated in the figures, the plurality of support ribs 130 may have ends (e.g., a first support rib ends 132 and a second support rib ends 134) and an intermediate body 136 extending between the ends 132, 134. The ends 132, 134 may have a cross-sectional area that is larger than the cross-sectional area of the intermediate body 136. As illustrated in FIG. 13, in some embodiments the cross-sectional area of the ends 132, 134 may decrease gradually from the ends 132, 134 towards at least a portion of the intermediate body 136. In some embodiments, the plurality of support ribs 130 may have an upper surface 138 and a lower surface 139. The upper surface 138 may be curved surface (e.g., rounded convex surface, or the like) having any type of shape, such as half circle, oval, teardrop, parabola, or any other type of curved surface, or another type of surface, such as planar, triangular, polygonal, or the like. In the illustrated embodiments, the upper surface 138 has a half-circle shape. Like the upper surface 138 the lower surface 139 may have any type of shape as described with respect to the upper surface 138. However, in the illustrated embodiment the lower surface 139 of the intermediate body 136 is planar shaped.

Figure 12:
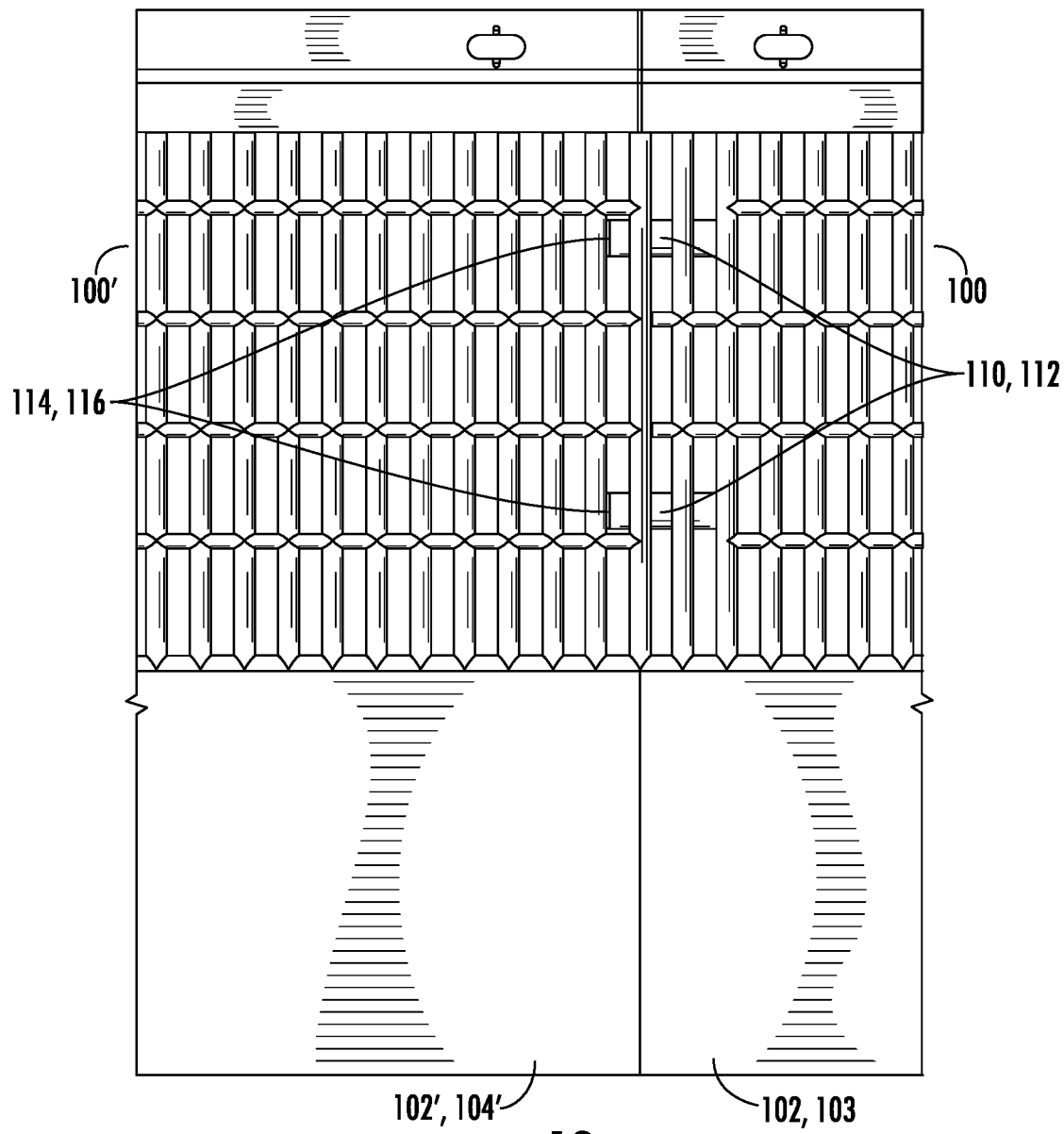
FIG. 12 illustrates an enlarged top view of the two adjacent covers assembled together of FIG. 9, in accordance with some embodiments of the disclosure.
Figure 13A:
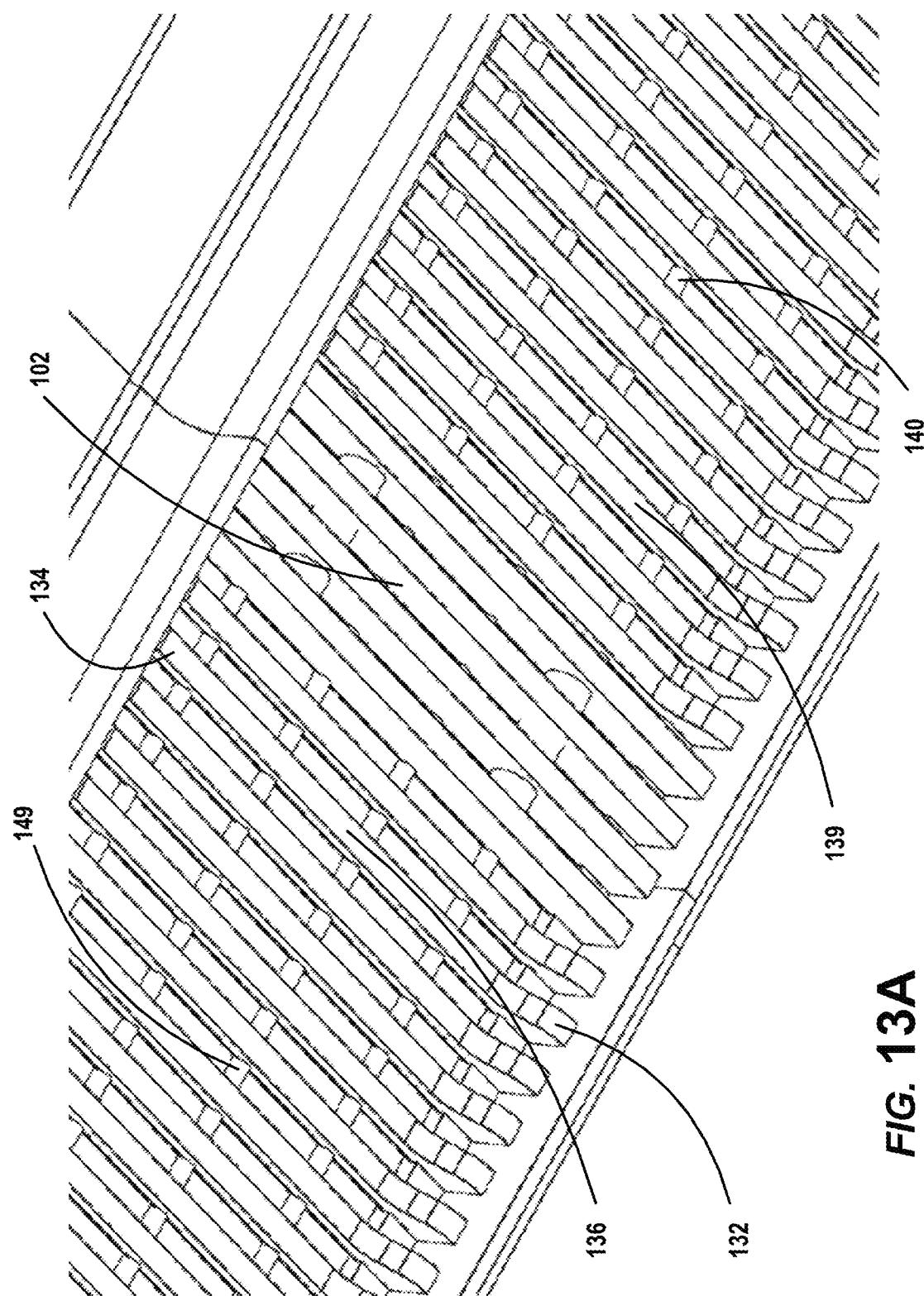
FIG. 13A illustrates an enlarged bottom perspective view of the two adjacent covers assembled together of FIG. 9, in accordance with some embodiments of the disclosure.
Figure 13B:
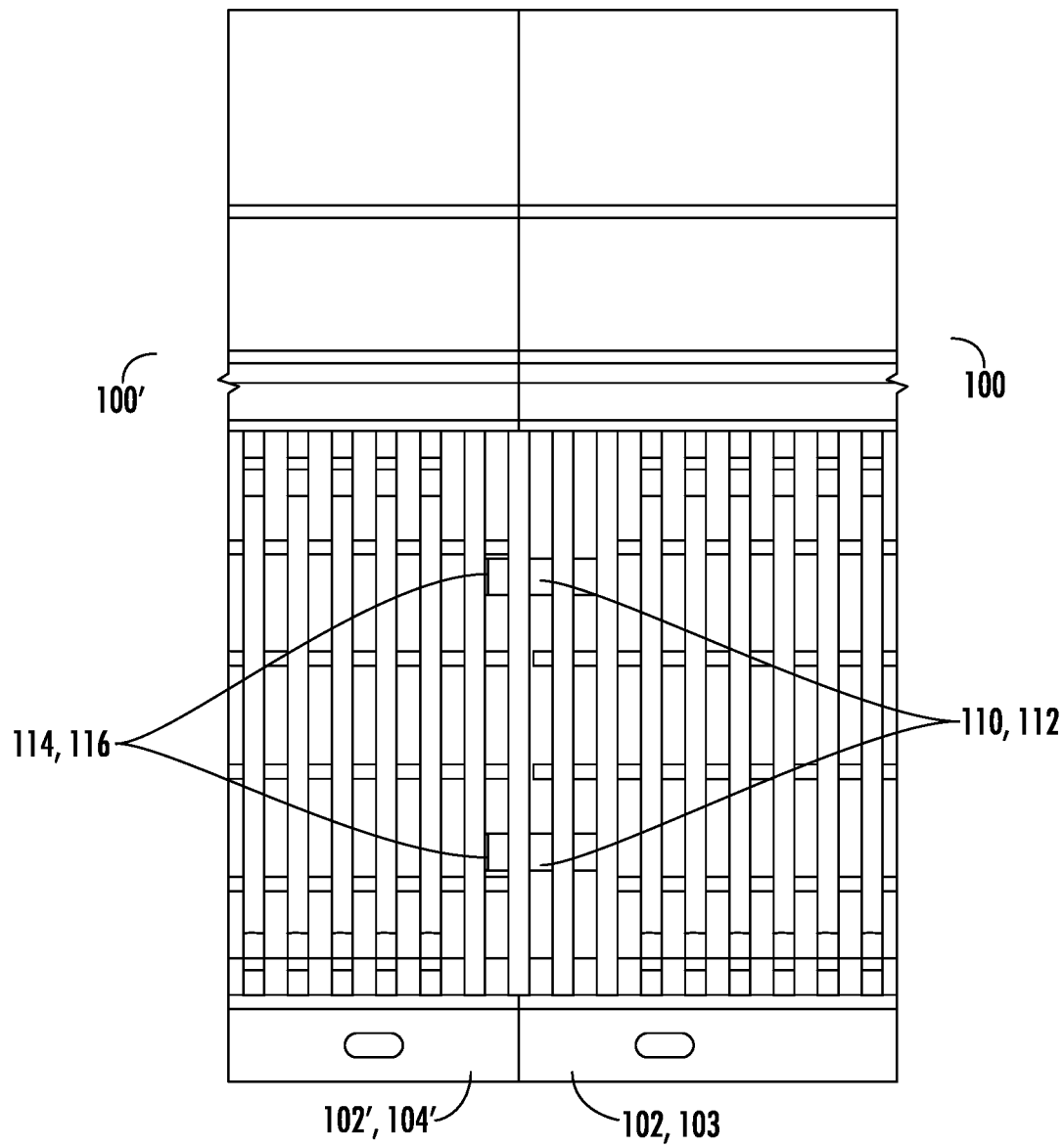
FIG. 13B illustrates an enlarged bottom view of the two adjacent covers assembled together of FIG. 9, in accordance with some embodiments of the disclosure.

The secondary set of ribs 124 may comprise of a plurality of connecting ribs 140 that are operatively coupled to the plurality of support ribs 130. The plurality of connecting ribs 140 may have ends (e.g., a first connecting end 142, and a second connecting end 144) and an intermediate body 146. As previously described with respect to the plurality of support ribs 130, the plurality of connecting ribs 140 may have any type of shape having an upper surface 148 and a lower surface 149. However, as illustrated in the figures the plurality of the connecting ribs 140 may have an upper surface 148 that is a half-circle and a lower surface 149 that is also a half-circle. As such, the plurality of connecting ribs 140 in the illustrated embodiment may have a circular cross-sectional area. It should be understood that in some embodiments the plurality of connecting ribs 140 may be operatively coupled to the lower surface 139 of the plurality of support ribs 130. In other embodiments, the plurality of connecting ribs 140 may be operatively coupled to the upper surface 138 of the plurality of support ribs 130. In other embodiments, the plurality of connecting ribs 140 may be operatively coupled between the sides of the plurality of support ribs 130 (e.g., extend between the sides of the of plurality of support ribs 130, extend through the sides of the plurality of support ribs 130, be a part of the plurality of support ribs 130—such as, integral with, or the like). Depending on the how the plurality of connecting ribs 140 are operatively coupled to the plurality of support ribs 130, the support rib upper surfaces 138 and the connecting rib upper surfaces 148 may be located on the same plane (e.g., the highest point of each upper surface 138, 148 are located on the same plane) or may be located on different planes (e.g., the highest point of the upper surfaces 138, 148 are located below or above each other). Like the upper surfaces 138, 148, the lower surfaces 139, 149 may be located on the same plane or on different planes. As such, the plurality of support ribs 130 and the plurality of connecting ribs 140 may be the same size or different sizes. It should be understood that the plurality of support ribs 130 and the plurality of connecting ribs 140 may be the same shape or different shapes. Moreover, different support ribs within the plurality of support ribs 130 may have different shapes and/or sizes, and different connecting ribs within the plurality of connecting ribs 140 may have different shapes and/or sizes. For example, as illustrated in FIG. 12, the plurality of support ribs 130 located adjacent the cover ends 102 (e.g., a first cover end 103 and a second cover end 104), may have a uniform cross-section throughout. The support ribs 130 located adjacent the cover end 102 may have a larger cross-section than the other support ribs 130 to provide additional support for the couplings 110, 114 at the ends 102 of the covers 100.

The grid segment 120 formed from the primary set of ribs 122 (e.g., the plurality of support ribs 130) and a secondary set of ribs 124 (e.g., the plurality of connecting ribs 140) form cavities between the ribs 122, 124, which allows water to pass through into the gutter 50. The cavities may be uniform or may alternate in size based on the number, shape, and/or placement of the ribs 122, 124. It should be understood that the primary set of ribs 122 and the secondary set of ribs 124 may extend in any direction with respect the front segment 160, the rear segment 180, and/or each other (e.g., parallel with each other, angled with respect to each other, or the like). In the illustrated embodiment, the primary set of ribs 122 (e.g., the plurality of support ribs 130) may be operatively coupled to the front segment 160 and the rear segment 180 (e.g., the first ends 132 of the plurality of support ribs 130 are operatively coupled to the front segment 160, and the second ends 134 of the plurality of support ribs 140 are operatively coupled to the rear segment 180).

Figure 3:
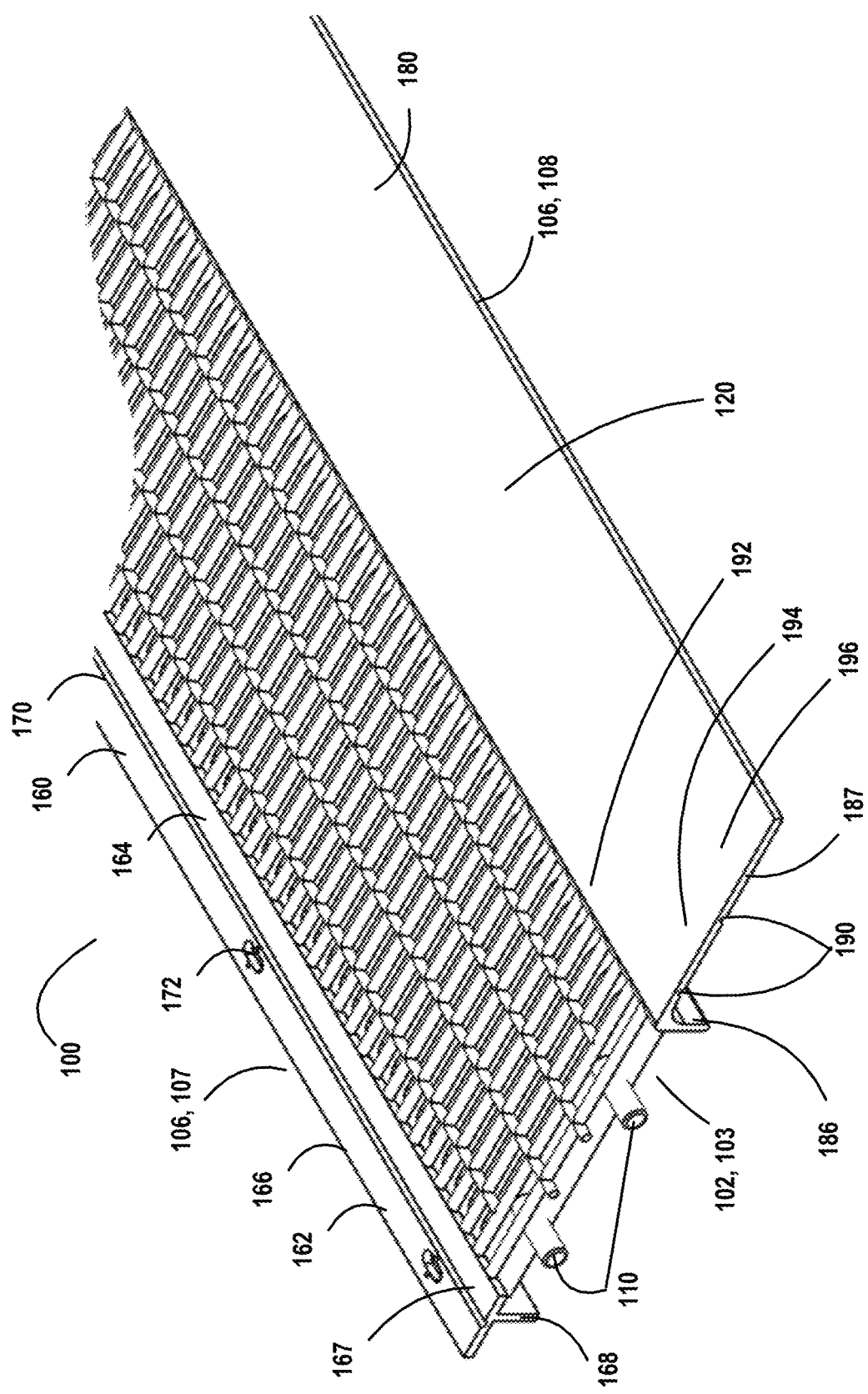
FIG. 3 illustrates an enlarged view of an end of the cover of FIG. 2, in accordance with some embodiments of the disclosure.
Figure 4:
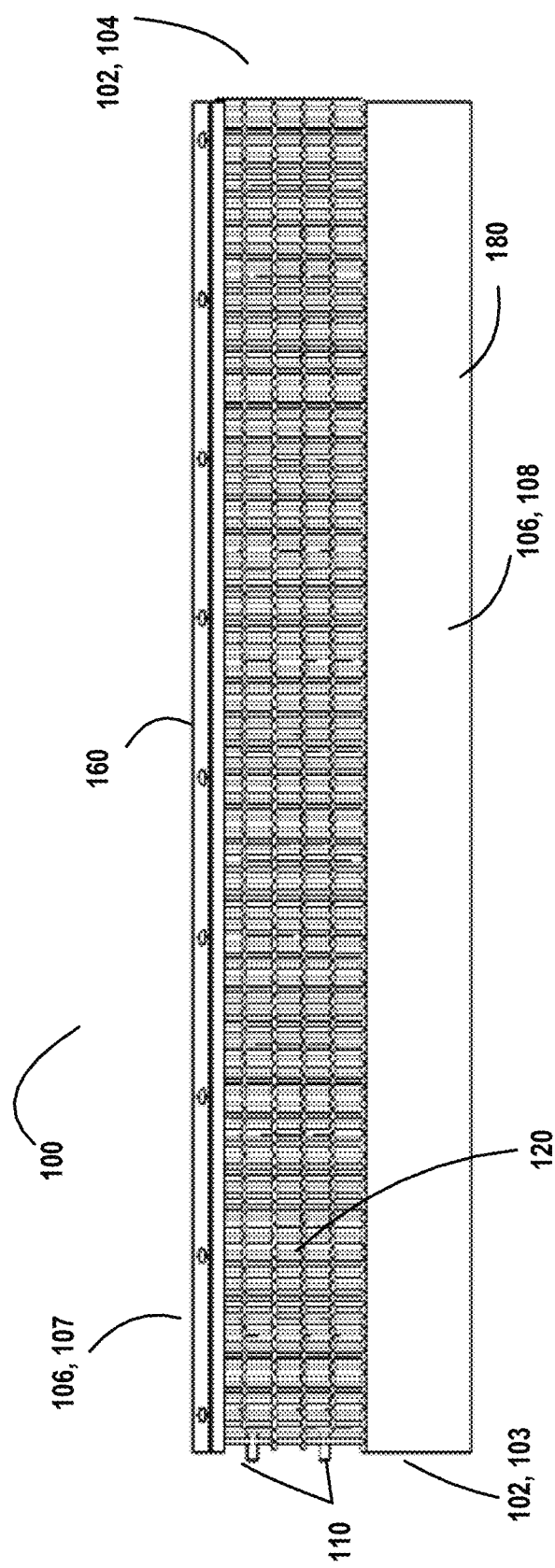
FIG. 4 illustrates a top view of the cover, in accordance with some embodiments of the disclosure.

The front segment 160 of the cover 100 may be any type of shape, such as an L-shaped, U-shaped, C-shaped, X-shaped, I-shaped, H-shaped, planar-shaped, T-shaped segment, or any other type of shape. As illustrated in FIG. 3, the front segment 160 may comprise a T-shaped segment 160 having a first front leg 166, a second front leg 167, and a third front leg 168. However, depending on the shape of the front segment 160, it may have any number of legs. The front segment 160 may comprise one or more channels 170, that may be utilized to aid in allowing a first front portion 162 of the front segment 160 to bend with respect to a second front portion 164 of the front segment 160 and/or with respect to the grid segment 120. The one or more channels 170 may be a continuous channel that extends between opposing cover ends 102 or a portion thereof, or it may be a discontinuous channel such that two or more series of channels extend between opposing cover ends 102 or a portion thereof. Moreover, it should be understood that the front segment 160 may comprise one or more front segment apertures 172. The one or more front segment apertures 172 may comprise one or more aperture protuberances 174. The one or more aperture protuberances 174 may be of any shape (e.g., circular, cylindrical, triangular, oval, any polygonal shape, or the like). The one or more aperture protuberances 174 may aid in allowing torquing fasteners to extend through the front segment apertures 172 without damaging the cover 100 (e.g., the protuberances 174 may be deformed when the fasteners are torqued and aid in preventing or minimizing the fastener from bearing down on the surface of the front segment adjacent the front segment apertures 172).

The rear segment 180 may be any type of shape, such as an L-shaped, U-shaped, C-shaped, X-shaped, I-shaped, H-shaped, planar-shaped, T-shaped segment, or any other type of shape. As illustrated in FIG. 3, the rear segment 180 may comprise a L-shaped segment 180 having a first rear leg 186 and a second rear leg 187. However, depending on the shape of the rear segment 180, it may have any number of legs. The front segment 180 may comprise one or more channels 190, that may be utilized to aid in allowing one or more portions of the rear segment 190 to bend with respect to each other and/or the grid segment 120. For example, a first rear portion 192, a second rear portion 194, and a third rear portion 196, or the like may bend with respect to each other and/or the grid segment 120. The one or more rear channels 190 may be continuous channels that extend between opposing cover ends 102 or a portion thereof, or may be a discontinuous channel such that two or more series of channels extend between opposing cover ends 102 or a portion thereof. Moreover, it should be understood that the rear segment 180 may comprise one or more rear segment apertures (not illustrated).

Figure 10:
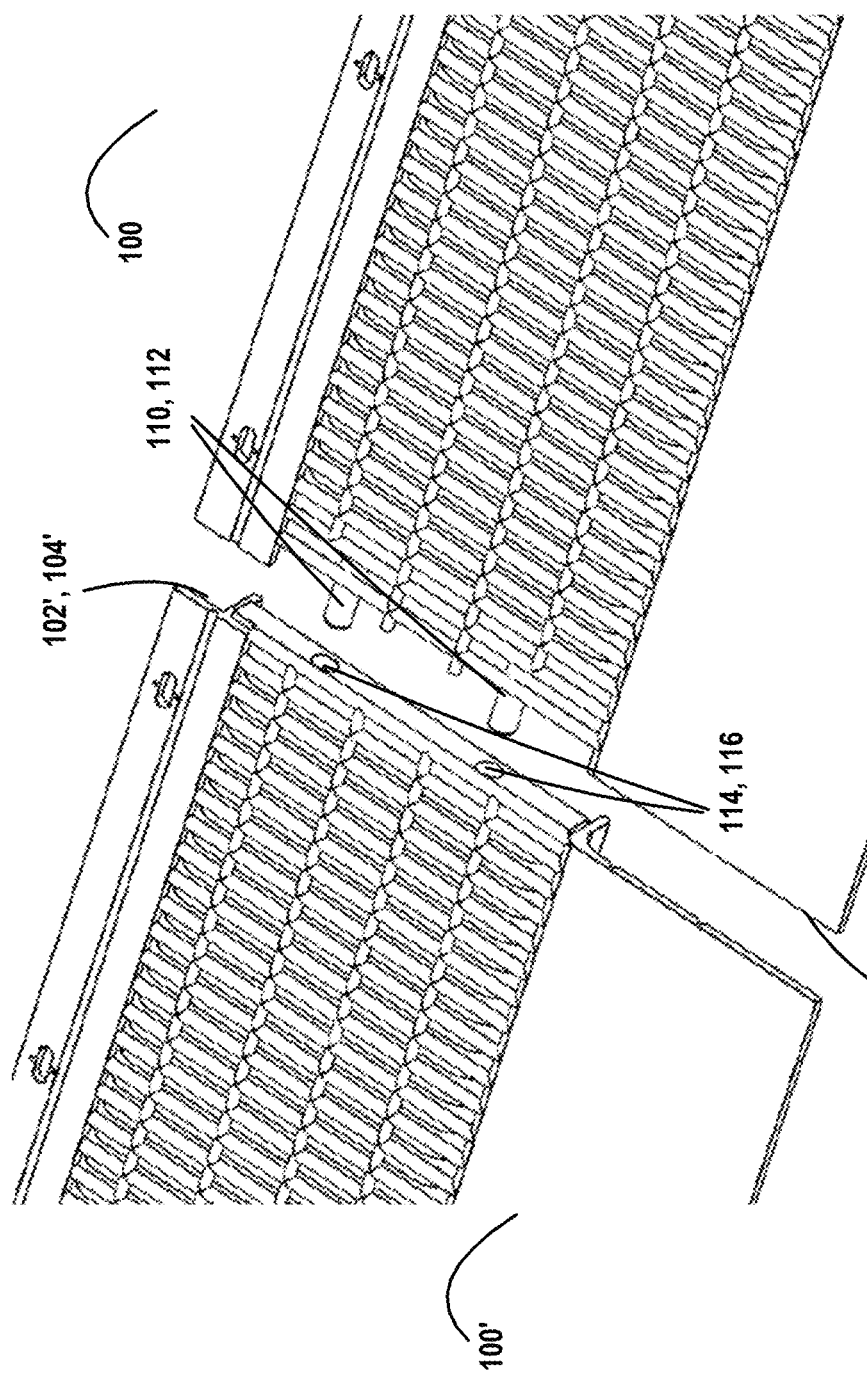
FIG. 10 illustrates a perspective view of two adjacent covers being assembled together, in accordance with some embodiments of the disclosure.
Figure 11:
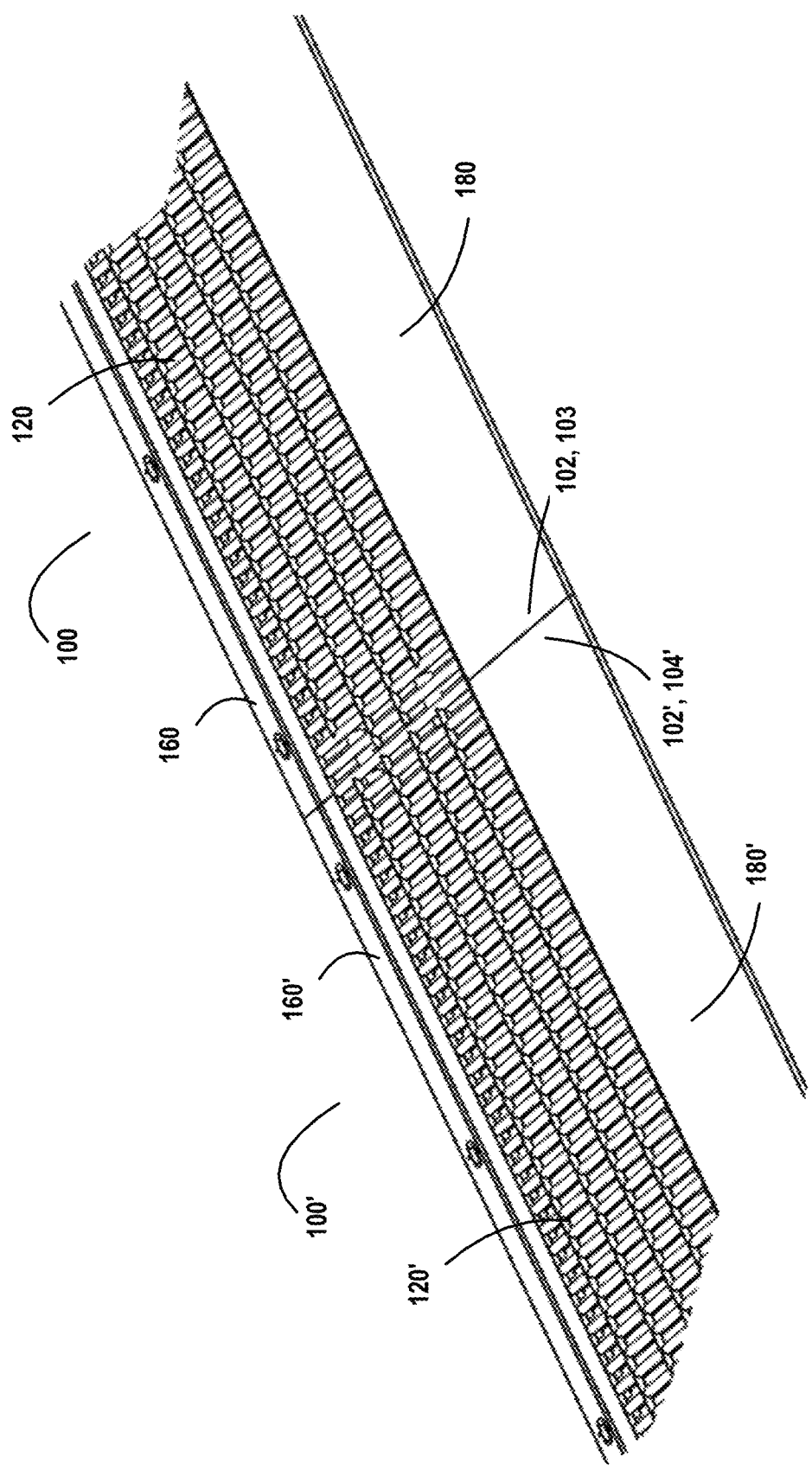
FIG. 11 illustrates an enlarged perspective view of the two adjacent covers assembled together of FIG. 9, in accordance with some embodiments of the disclosure.

FIGS. 9 through 13B illustrate two adjacent covers 100 operatively coupled, or in the process of being operatively coupled, together. As illustrated in FIGS. 7 and 8, a first cover end 103 of the cover 100 may have one or more first couplings 110 and the second cover end 104 may have one or more second couplings 114. The one or more first couplings 110 of a first cover 100 may be operatively coupled to the one or more second couplings 114 of a second cover 100 to assemble adjacent covers 100. It should be understood that the couplings 110, 114 may be any type of coupling. However, as illustrated in the FIGS. 7, 8, and 10, the one or more first couplings 110 may comprise one or more projections 112, while the one or more second couplings 114 may comprise one or more cavities 116 formed in the second cover end 104 (e.g., in one or more of support ribs 130, or the like). As illustrated in FIG. 10, the one or more projections 112 may be inserted into the one or more cavities 116. The one or more first couplings 110 and the one or more second couplings 114 may allow for thermal expansion and contraction. Adjacent covers 100 may be operatively coupled to each other slidably to create different sized gaps between adjacent covers 100. For example, the one or more projections 112 may slide within the one or more cavities 116 as adjacent covers 100 heat up and cool off.

While the one or more projections 112 are illustrated as being on a first cover end 103 and the one or more cavities 116 are illustrated as being on a second cover end 104 it should be understood that a first cover end 103 may have one or more projections 112 and one or more cavities 116, and the second cover end 104 may have one or move cavities 116 and one or more projections 112. While the one or more projections 112 are illustrated as being cylindrical projections, and the one or more cavities 116 are illustrated as being cylindrical cavities, the one or more projections 112 and/or the one or more cavities 116 may be any type of shape (e.g., rectangular, triangular, any polygonal shape, or the like). Furthermore, while the couplings are illustrated as projections and cavities, it should be understood that any type of couplings 110, 114 may be used to operatively couple to adjacent covers 100, such as interlocking fingers, overlapping projections, slots and pins, fasteners, or any other couplings that operatively couple adjacent covers 100.

Figure 14A:
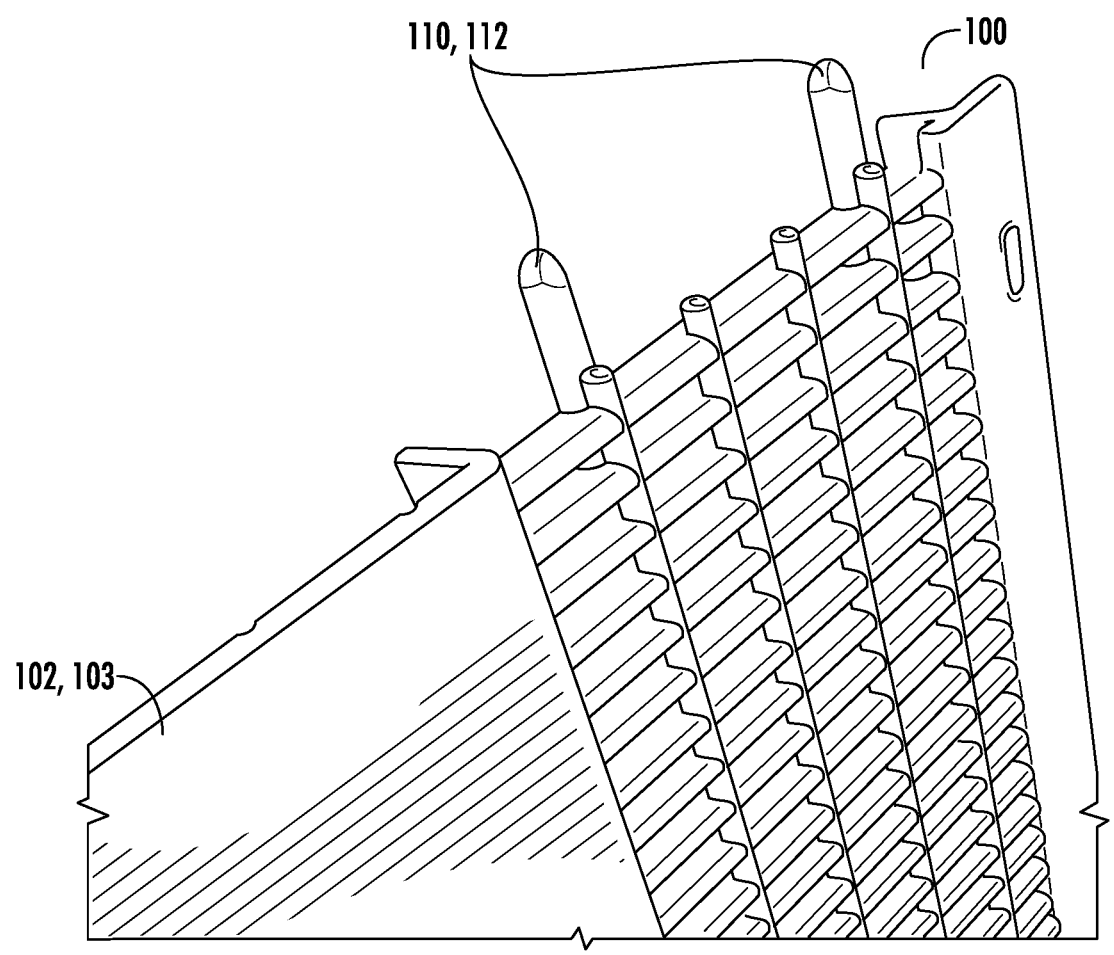
FIG. 14A illustrates a perspective view of one end of a cover, in accordance with some embodiments of the disclosure.
Figure 14B:
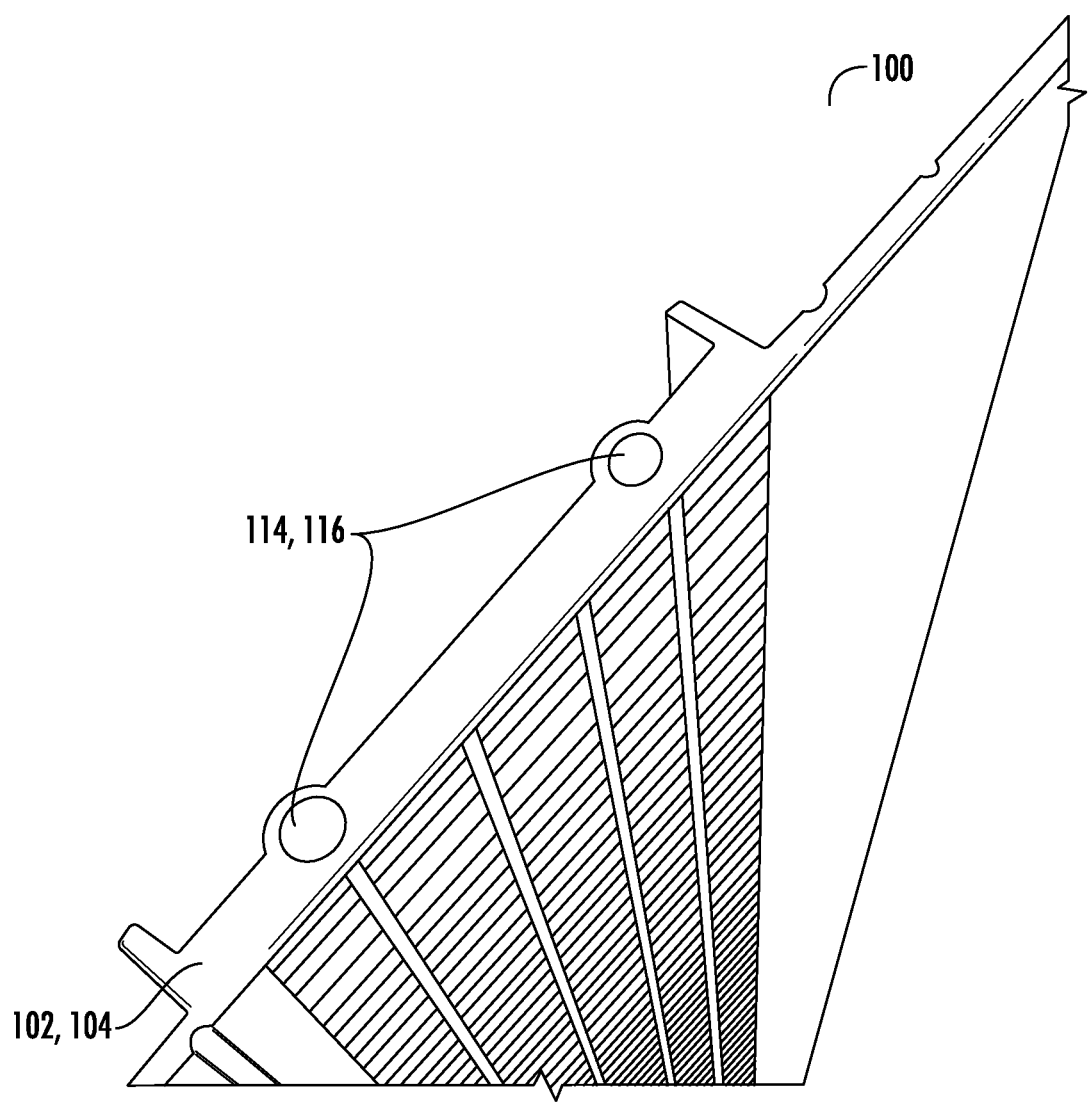
FIG. 14B illustrates a perspective view of one end of a cover, in accordance with some embodiments of the disclosure.
Figure 14C:
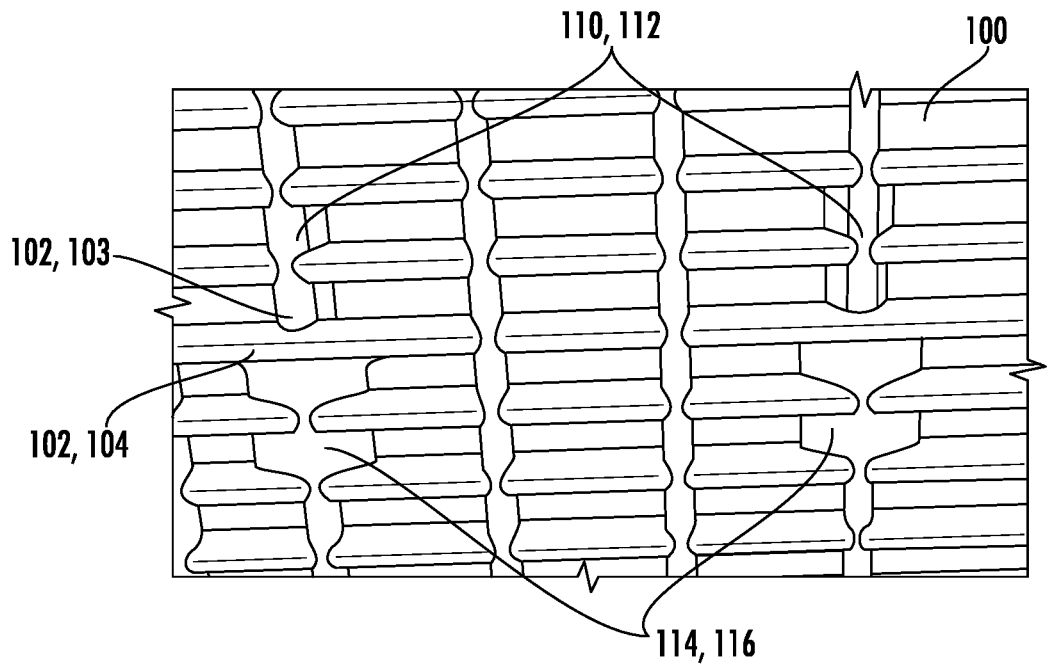
FIG. 14C illustrates an enlarged top view of two adjacent covers assembled together, in accordance with some embodiments of the disclosure.
Figure 14D:
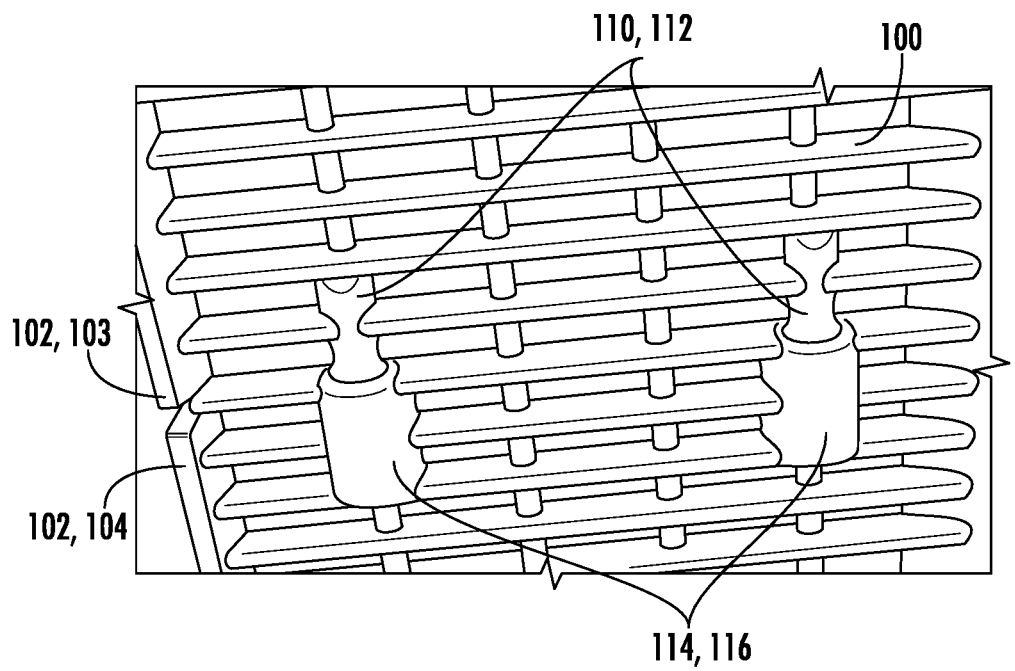
FIG. 14D illustrates an enlarged bottom view of two adjacent covers assembled together, in accordance with some embodiments of the disclosure.
Figure 16A:
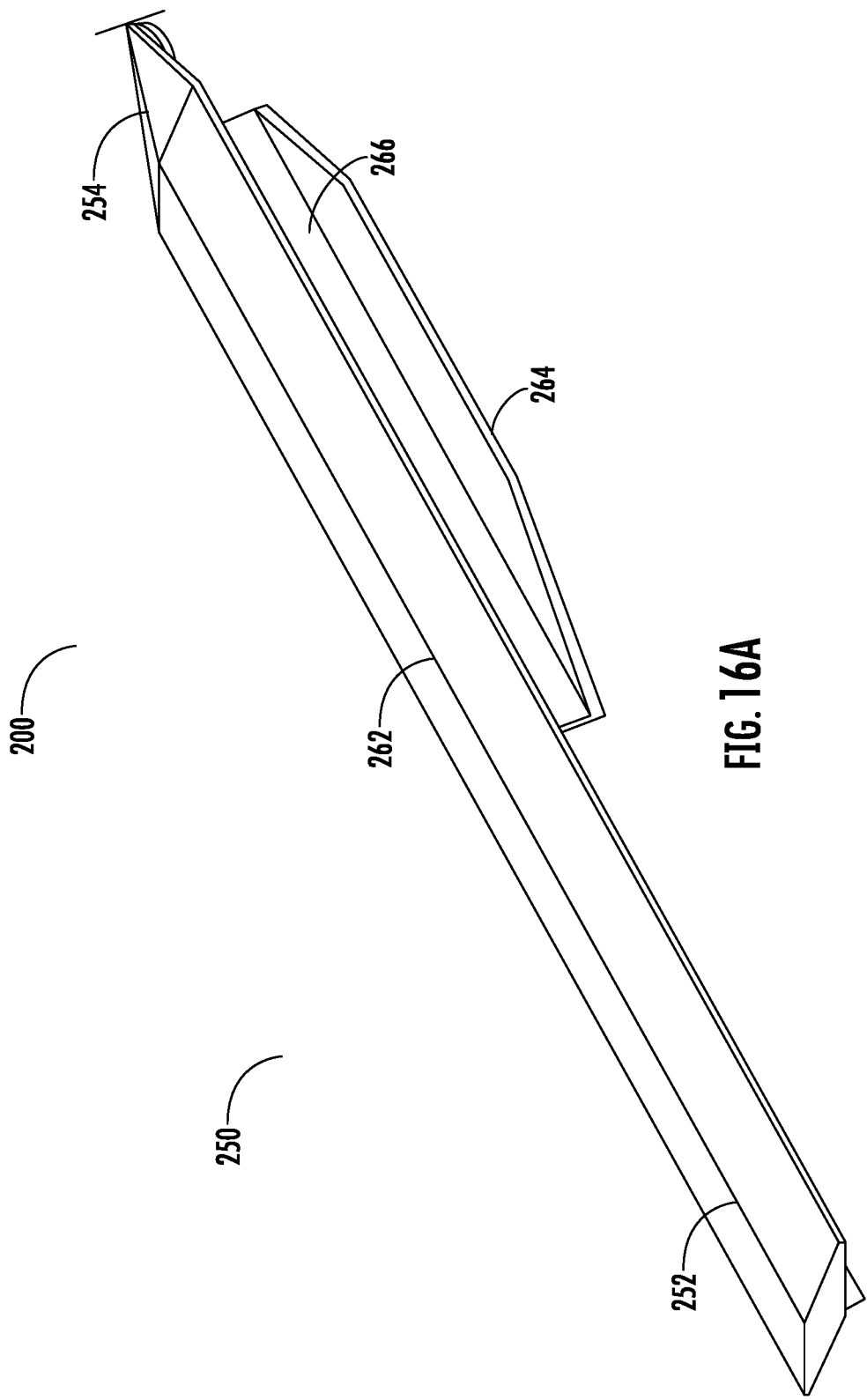
FIG. 16A illustrates a perspective view of an inside corner strip for assembling adjacent covers at an inside corner of two gutters, in accordance with some embodiments of the disclosure.

FIGS. 14A through 14D illustrate other embodiments of the couplings of the cover before and after being assembled. As illustrated in FIG. 14A the one or more first couplings 110 of the first cover 103 may be projections that have a rounded end. As illustrated in FIG. 14B the one or more second couplings 114 may be cavities 116 that extend through one or more ribs 130, in particular three or move ribs 130. As previously discussed, the one or more first couplings 110 of a first cover 100 may be operatively coupled to the one or more second couplings 114 of a second cover 100 to assemble adjacent covers 100, as illustrated in FIGS. 14C and 14D. As previously discussed with respect to couplings illustrated in FIGS. 9 through 13A, the couplings illustrated in FIGS. 14A through 14D may operate in the same or similar way. However, the couplings in FIGS. 14A through 14D may allow for improved support since the one or more first couplings 110 may extend farther into the one or more second couplings 114 within the grid segment 120 of the cover 100.

As will be described in further detail with respect to FIG. 17, when two adjacent covers 100 meet at the corners of the gutters 50, such as internal corners and/or outer corners of two adjacent gutters 50, a corner strip 200 may be utilized to operatively couple two covers 100 together. For example, with respect to gutters 50 that create an outer corner, an outer corner strip 210 may be utilized to operatively couple adjacent covers 100. As illustrated in FIGS. 15A through 15D, the outer corner strip 210 may have an outer strip front portion 212 (e.g., with a pointed end, or the like) and an outer strip rear portion 214. The front portion 212 may be operatively coupled to an outer portion of the outer corner of the gutters 50, while the rear portion 214 of the outer corner strip 210 may be trimmed as needed during installation and operatively coupled to the inner portion outer corner of the gutters 50 (e.g., portion closer to the structure). The outer corner strip 210 may further comprise an outer strip upper portion 222 and an outer strip lower portion 224. The upper portion 222 and the lower portion 224 may form a first slot 226 and a second slot 228. The slots 226, 228 may be angled downwardly away from the upper portion 222. When installed, the covers 100 are angled upwardly from the front wall 54 of the gutter 50 to the rear wall 58 and/or the structure, as such the angled slots allow a first cover end 103 of a first cover 100 to fit within the first slot 226 and a second cover end 104 of a second cover to fit within the second slot 228 flush (e.g., without misalignment, with reduced misalignment, or the like) when used on an outer corner of gutters 50.

Alternatively, with respect to adjacent gutters 50 that create an inner corner, an inner corner strip 250 may be utilized to operatively couple adjacent covers 100. As illustrated in FIGS. 16A through 16D, the inner corner strip 250 may have an inner strip front portion 252 and an inner strip rear portion 254 (e.g., with a pointed end, or the like). The rear portion 254 may be operatively coupled adjacent to the inner portion of the inner corner of the gutters 50 (e.g., near the structure), while the inner strip front portion 252 of the inner corner strip 250 may be trimmed as needed during installation and operatively coupled adjacent to the outer portion of the inner corner of the gutters 50. The inner corner strip 250 may further comprise an inner strip upper portion 262 and an inner strip lower portion 264. The upper portion 262 and the lower portion 264 may form a first slot 266 and a second slot 268. The slots 266, 268 may be angled upwardly away from the lower portion 264. When installed, the covers 100 are angled upwardly from the front wall 54 of the gutter 50 to the rear wall 58 and/or the structure, as such the angled slots 266, 268 allow a first cover end 103 of a first cover 100 to fit within the first slot 266, and the second cover end 104 of a second cover 100 to fit within the second slot 268 flush (e.g., without misalignment, with reduced misalignment, or the like) when used on an outer corner of the gutters 50.

It should be understood that the upper portions 222, 262 of the corner strips (e.g., the inner corner strip 210, the outer corner strip 250) may be contoured, such as having a curved, angled, or the like surface, which directs water to the covers 100 (e.g., rib segments 120, or the like). In the illustrated embodiments, the contoured surfaces are angled (e.g., come to a peak, or the like). The contoured surface aids in reducing water runoff from the corner strips off of the corner of the gutter 50. For example, a corner strip that has a uniform surface (e.g., flat surface, or the like) may run water off of the corner strip and off of the gutter system 10 before draining inside of the gutter 50.

It should be understood that in some embodiments the corner strips 200 may comprise a projection (e.g., a handle feature(s) extending from the upper portions 222, 262, or the like) that aid in installation of the corner strips 200 and/or the covers 100. For example, an installer may be able to hold the projection while installing the covers 100 and/or the corner strips 200. As illustrated in FIGS. 15A through 16D, the upper portions 222, 262 may comprise one or more apertures 280. The one or more apertures 280 may be used for operatively coupling a handle, such as a removable handle. In some embodiments, the handle may be a fastener (e.g., a screw, or the like) that can be screwed into an aperture 280 during installation, but thereafter removed after installation.

In some embodiments, the corner strips 200 maybe reversible such that one side may face up when being installed for an inner corner and the other side may face up when being installed for an outer corner. In this embodiment, the corner strips 200 may be trimmed as necessary depending on if they are being installed in an inner corner or an outer corner.

Figure 17:
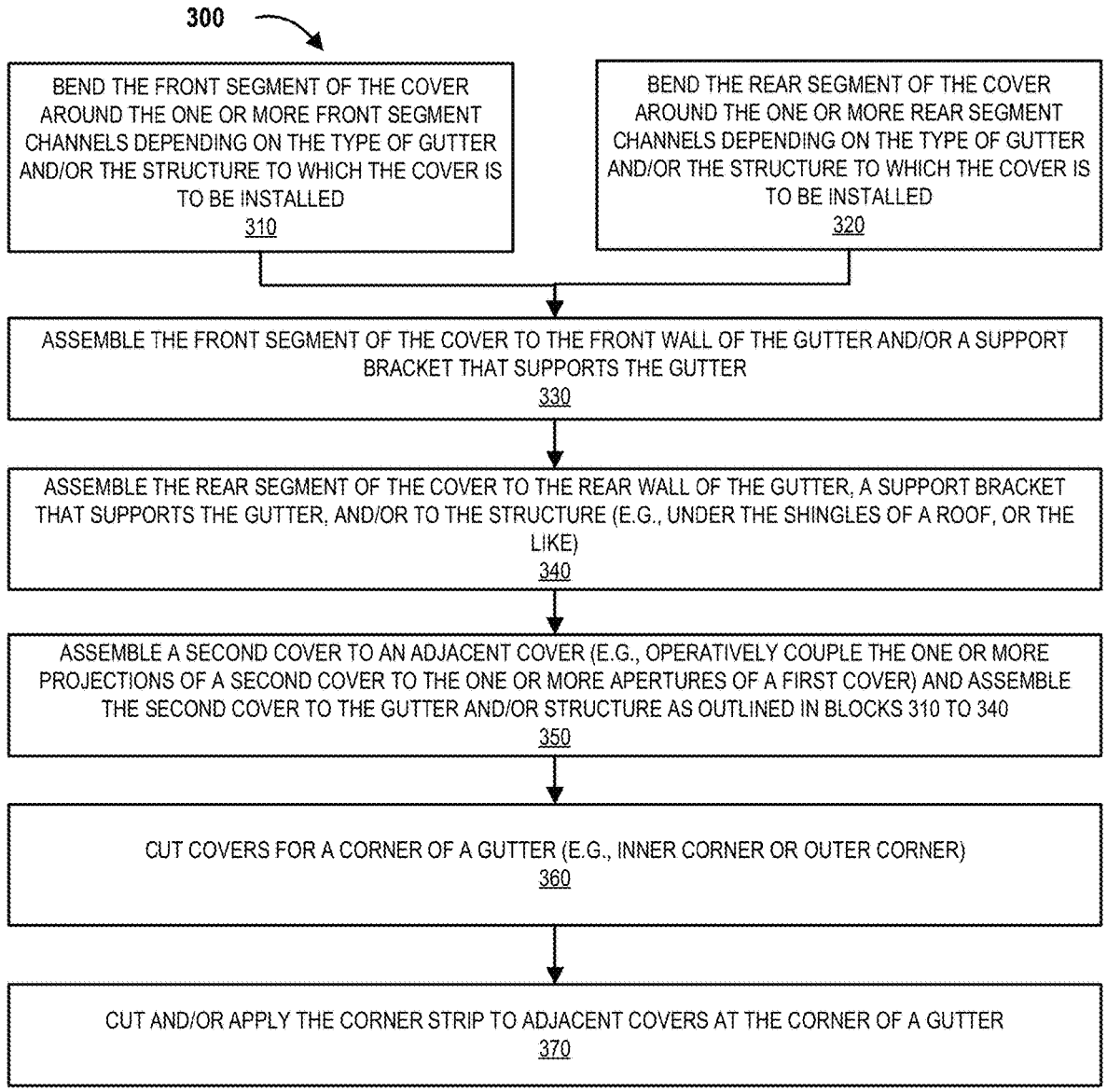
FIG. 17 illustrates a process flow for installing covers on a gutter to form a gutter system, in accordance with some embodiments of the disclosure.

FIG. 17 illustrates a cover installation process 300 for installing the cover(s) 100 to the gutters 50 of the gutter systems 10 and/or the structure. As illustrated in block 310 of FIG. 17, the front segment 160 of the cover 100 may be bent. For example, the one or more front channels 170 may be used to bend a portion of the front segment 160, such as a first portion 162 with respect to a second portion 164 of the front segment 160.

Block 320 of FIG. 17 illustrates that the rear segment 180 of the cover 100 may be bent. For example, the one or more rear channels 190 may be used to bend a portion of the rear segment 180, such as a first rear portion 192, a second rear portion 194, and/or a third rear portion 196 with respect to each other and/or the grid segment 120, or the like.

The front segment 160 and the rear segment 180 may be bent depending on the type of gutter 50 being used, the location of the gutter 50 on the structure, the type of structure to which the gutter 50 and cover are being installed, or the like. In some embodiments, in addition to being bent, or in the alternative, the rear segment 180 may be trimmed before being installed.

Block 330 of FIG. 17 further illustrates that the front segment 160 of the cover 100 is assembled to the gutter 50, such as to the front wall 54 and/or lip 52 of the gutter 50. The front segment 160 may be operatively coupled to the gutter 50 using one or more couplings. For example, fasteners (not illustrated) may be used to operatively couple the front segment 160 of the cover 100 to the lip 52 through the one or more front segment apertures 172. However, it should be understood that other types of couplings may be used to operatively couple the front segment 160 to the gutter 50.

FIG. 17 further illustrates in block 340 that the rear segment 180 of the cover 100 is assembled to the structure, such as the roof of a building (e.g., under the shingles of the roof, or the like). Like the front segment 160 of the cover 100, the rear segment 180 of the cover 100 may be operatively coupled to the building using any type of coupling, such as fasteners, adhesive (e.g., glue, tape, caulking, epoxy, or the like), or the like.

Block 350 of FIG. 17 further illustrates that a second cover 100 may be assembled to an adjacent cover 100 and the gutter 50 as previously discussed with respect to blocks 310 through 340. Moreover, the first end couplings 110 (e.g., one or more projections 112, or the like) of a first cover 100 may be operatively coupled to the second end couplings 114 (e.g., one or more cavities 116, or the like) of a second cover 100. The first end 103 of a first cover 100 may be spaced slightly apart from the second end 104 of a second cover 100, such that a gap (e.g., $\frac{1}{16}$, $\frac{1}{8}$, $\frac{1}{4}$, $\frac{1}{2}$, or the like inches of space) may be located between the first end 103 of the first cover 100 and the second end 104 of the second cover 100, thus allowing for thermal expansion and/or contraction of the adjacent covers 100 after installation. The size of the gap may be changed based on the temperature during installation of the covers 100.

When the covers 100 are being installed at a corner between two gutters 50, such as an inner corner or an outer corner, as illustrated in block 360 in FIG. 17 an end 102 of the cover 100 may be cut, such as at a 45 degree angle (or another angle depending on the installation of the gutters 50). The covers 100 may be cut for inside corners or outside corners. As illustrated by block 370 of FIG. 17, when an outside corner is used the outside corner strip 210 may be used to assemble the ends 102 of adjacent covers 100, while when an inside corner is present the inside corner strip 250 may be used to assemble the end 102 of adjacent covers 100. The angled ends (e.g., cut ends, or the like) of the covers 100 may be assembled into the slots of the corner strips 210, and the covers 100 may be operatively coupled to the gutter 50 as previously discussed herein. In other embodiments of the invention, the same corner strip 200 may be used regardless of the type of corner. In some embodiments the corner strips 200 may be reversible, such that they installed with one side facing up for one type of corner, and flipped over such that the other side is facing when used on a different corner. The corner strips 200 may be trimmed as needed for installation.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A cover for a gutter, the cover comprising:
   a grid segment formed from a primary set of ribs and a secondary set of ribs;
   a front segment operatively coupled to the grid segment; and
   a rear segment operatively coupled to the grid segment,
   wherein the primary set of ribs extend between the front segment and the rear segment, and the secondary set of ribs extend between the primary set of ribs;
   wherein a primary upper surface of the primary set of ribs and a secondary upper surface of the secondary set of ribs are located on the same plane;
   wherein the front segment is configured to be operatively coupled to a front wall or front lip of a gutter; and
   wherein the rear segment is configured to be operatively coupled to a rear wall of the gutter or a support member of a structure.

2. The cover of claim 1, wherein the primary set of ribs extend perpendicularly between the front segment and the rear segment.

3. The cover of claim 1, wherein the secondary set of ribs extend perpendicularly between the primary set of ribs.

4. The cover of claim 1, wherein at least one end of the primary set of ribs has an end cross-sectional area that is greater than an intermediate cross-sectional area of an intermediate portion of the primary set of ribs.

5. The cover of claim 1, wherein the primary set of ribs have a primary upper surface that is rounded.

6. The cover of claim 5, wherein the primary set of ribs have primary side surfaces or primary lower surfaces that are planar.

7. The cover of claim 1, wherein the secondary set of ribs have secondary upper surfaces that are rounded.

8. The cover of claim 1, wherein the cover has opposing ends and opposing edges, and wherein the cover further comprises:
   one or more projections on a first opposing end; and
   one or more cavities formed within a second opposing end,
   wherein at least the second opposing end has an end cross-sectional thickness at the one or more cavities that is greater than a cross-sectional thickness of intermediate primary ribs; and
   wherein the one or more projections on the first opposing end are configured to be operatively coupled with one or more cavities of an adjacent cover to form a cover assembly.

9. The cover of claim 1, wherein the front segment comprises a T-shaped segment comprising a first front leg, a second front leg, and a third front leg extending downwardly, wherein the front segment comprises one or more front channels located in the first front leg, wherein the one or more front channels aid in allowing the first front leg to bend with respect to the second front leg and the third front leg.

10. The cover of claim 9, further comprising:
    a plurality of front segment apertures located in the first front leg, wherein at least one front channel of the one or more front channels are located between the plurality of front segment apertures and an intersection of the second front leg and the third front leg.

11. The cover of claim 1, wherein the rear segment comprises one or more rear channels, wherein the one or more rear channels aid in allowing one or more rear portions of the rear segment to bend.

12. The cover of claim 1, wherein the rear segment comprises an L-shaped segment comprising a first rear leg and a second rear leg, wherein the first rear leg extends downwardly away from the primary set of ribs, and wherein the second rear leg extends outwardly away from the primary set of ribs.

13. A cover for a gutter having opposing ends and opposing edges, the cover comprising:
a grid segment formed from a primary set of ribs and a secondary set of ribs extending between the opposing ends;
a front segment operatively coupled to the grid segment and forming a first opposing edge;
a rear segment operatively coupled to the grid segment and forming a second opposing edge;
one or more projections on a first opposing end; and
one or more cavities formed on a second opposing end,
wherein at least the second opposing end has an end cross-sectional thickness at the one or more cavities that is greater than a cross-sectional thickness of intermediate primary ribs;
wherein the one or more projections on the first opposing end are configured to be operatively coupled with one or more cavities of an adjacent cover to form a cover assembly;
wherein the front segment is configured to be operatively coupled to a front wall or front lip of a gutter; and
wherein the rear segment is configured to be operatively coupled to a rear wall of the gutter or a support member of a structure.

14. A cover for a gutter, the cover comprising:
a grid segment formed from a primary set of ribs and a secondary set of ribs;
a front segment operatively coupled to the grid segment, wherein the front segment comprises a T-shaped segment comprising:
a first front leg;
a second front leg; and
a third front leg extending downwardly;
wherein the front segment comprises one or more front channels located in the first front leg, wherein the one or more front channels aid in allowing the first front leg to bend with respect to the second front leg and the third front leg; and
a rear segment operatively coupled to the grid segment;
wherein the front segment is configured to be operatively coupled to a front wall or front lip of a gutter; and
wherein the rear segment is configured to be operatively coupled to a rear wall of the gutter or a support member of a structure.

15. A cover for a gutter, the cover comprising:
a grid segment formed from a primary set of ribs and a secondary set of ribs;
a front segment operatively coupled to the grid segment; and
a rear segment operatively coupled to the grid segment, wherein the rear segment comprises an L-shaped segment comprising:
a first rear leg; and
a second rear leg;
wherein the first rear leg extends downwardly away from the primary set of ribs, and wherein the second rear leg extends outwardly away from the primary set of ribs,
wherein the front segment is configured to be operatively coupled to a front wall or front lip of a gutter; and
wherein the rear segment is configured to be operatively coupled to a rear wall of the gutter or a support member of a structure.

* * * * *